(12) United States Patent
Hirano et al.

(10) Patent No.: US 11,099,033 B2
(45) Date of Patent: Aug. 24, 2021

(54) POSITION DETECTION SYSTEM

(71) Applicant: TDK CORPORATION, Tokyo (JP)

(72) Inventors: Hiroyuki Hirano, Tokyo (JP);
Teiichiro Oka, Tokyo (JP); Yosuke Antoku, Tokyo (JP)

(73) Assignee: TDK CORPORATION, Tokyo (JP)

( * ) Notice: Subject to any disclaimer, the term of this patent is extended or adjusted under 35 U.S.C. 154(b) by 6 days.

(21) Appl. No.: 16/546,455

(22) Filed: Aug. 21, 2019

(65) Prior Publication Data
US 2020/0064156 A1 Feb. 27, 2020

(30) Foreign Application Priority Data

Aug. 22, 2018 (JP) .............. JP2018-155642
Mar. 20, 2019 (JP) .............. JP2019-052941

(51) Int. Cl.
*G01D 5/14* (2006.01)
*G01D 5/16* (2006.01)
*G01D 5/245* (2006.01)

(52) U.S. Cl.
CPC .............. *G01D 5/14* (2013.01); *G01D 5/16* (2013.01); *G01D 5/245* (2013.01)

(58) Field of Classification Search
CPC .......... G01D 5/14; G01D 5/20; G01D 5/2013; G01D 5/2033
See application file for complete search history.

(56) References Cited

U.S. PATENT DOCUMENTS

| | | | | |
|---|---|---|---|---|
| 4,406,272 A | * | 9/1983 | Kiess | F02P 7/07 123/146.5 A |
| 4,535,289 A | * | 8/1985 | Abe | G01D 5/147 324/207.12 |
| 5,670,876 A | * | 9/1997 | Dilger | G01D 5/147 324/207.13 |
| 5,781,005 A | | 7/1998 | Vig et al. | |
| 5,814,985 A | * | 9/1998 | Oudet | G01B 7/003 324/207.2 |

(Continued)

FOREIGN PATENT DOCUMENTS

| CN | 107101653 A | 8/2017 |
|---|---|---|
| DE | 102007023815 A1 | 11/2008 |

(Continued)

*Primary Examiner* — Walter L Lindsay, Jr.
*Assistant Examiner* — Milton Gonzalez
(74) *Attorney, Agent, or Firm* — Oliff PLC

(57) ABSTRACT

A position detection system includes a first magnet, a first soft ferromagnetic member, and a magnetic detector. The first magnet is magnetized in a first direction and generates a first magnetic field including a first magnetic line. The first soft ferromagnetic member is rectilinearly movable along a second direction and includes a first outer edge having a first outer edge part remote from the first magnet by a first distance in a third direction and a second outer edge part remote from the first magnet by a second distance in the third direction. The first and second outer edge parts are disposed at different positions in the second direction. The magnetic detector is kept at a predetermined constant position relative to the first magnet. The first magnetic line passes through the magnetic detector in the first direction when the first soft ferromagnetic member is at rest.

15 Claims, 29 Drawing Sheets

(56) References Cited

U.S. PATENT DOCUMENTS

| | | | |
|---|---|---|---|
| 6,043,646 A * | 3/2000 | Jansseune | H03K 17/9515 |
| | | | 324/207.26 |
| 6,275,025 B1 | 8/2001 | Wiese | |
| 6,305,234 B1 * | 10/2001 | Thies | G01D 5/145 |
| | | | 250/231.18 |
| 7,026,809 B2 * | 4/2006 | Dufour | G01D 5/147 |
| | | | 324/174 |
| 7,906,959 B2 * | 3/2011 | Frachon | G01D 5/147 |
| | | | 324/207.25 |
| 8,624,586 B2 * | 1/2014 | Dordet | G01D 5/145 |
| | | | 324/207.2 |
| 8,698,738 B2 | 4/2014 | Sakurai et al. | |
| 8,711,089 B2 | 4/2014 | Sakurai et al. | |
| 8,836,324 B2 * | 9/2014 | Loreit | G01D 5/147 |
| | | | 324/207.21 |
| 8,896,294 B2 | 11/2014 | Fukuoka et al. | |
| 9,062,989 B2 * | 6/2015 | van Veldhoven | G01D 5/2451 |
| 9,664,494 B2 | 5/2017 | Fernandez et al. | |
| 10,337,891 B2 | 7/2019 | Yokotani et al. | |
| 10,852,163 B2 | 12/2020 | Isoda et al. | |
| 2010/0026282 A1 | 2/2010 | Kaita et al. | |
| 2017/0219383 A1 * | 8/2017 | Umehara | G01P 3/481 |
| 2018/0080801 A1 * | 3/2018 | Akiyama | G01D 5/22 |

FOREIGN PATENT DOCUMENTS

| | | | |
|---|---|---|---|
| JP | S58015113 A | | 1/1983 |
| JP | H07-55416 A | | 3/1995 |
| JP | H09-049740 A | | 2/1997 |
| JP | H09-281127 A | | 10/1997 |
| JP | 2000-516720 A | | 12/2000 |
| JP | 2002-310610 A | | 10/2002 |
| JP | 2004239683 A | * | 8/2004 |
| JP | 2006-084416 A | | 3/2006 |
| JP | 2006-153670 A | | 6/2006 |
| JP | 2009-133751 A | | 6/2009 |
| JP | 5013146 B2 | | 8/2012 |
| JP | 2014-92418 A | | 5/2014 |
| JP | 2015-132496 A | | 7/2015 |
| JP | 2016-519310 A | | 6/2016 |
| WO | 2015/056346 A1 | | 4/2015 |
| WO | 2018/078855 A1 | | 5/2018 |

* cited by examiner

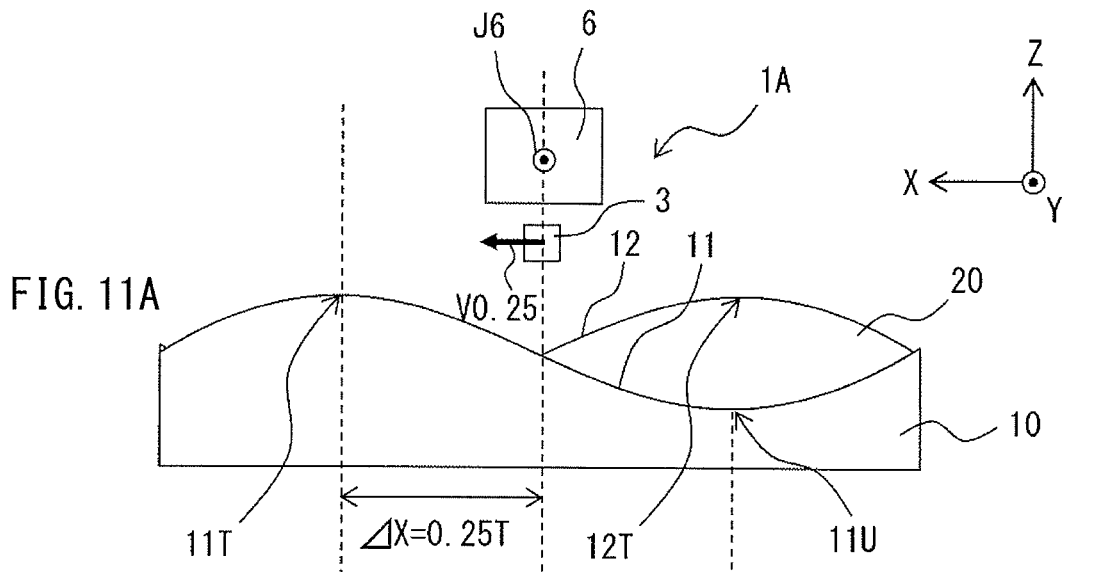
FIG. 11A
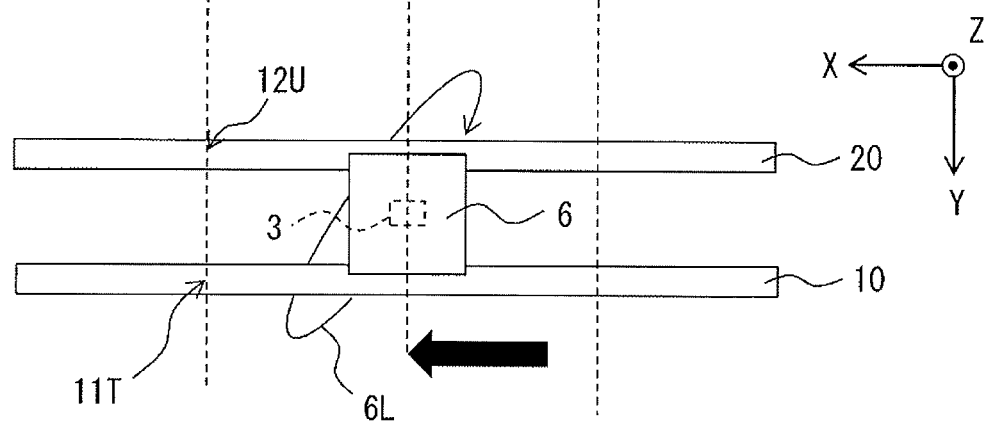
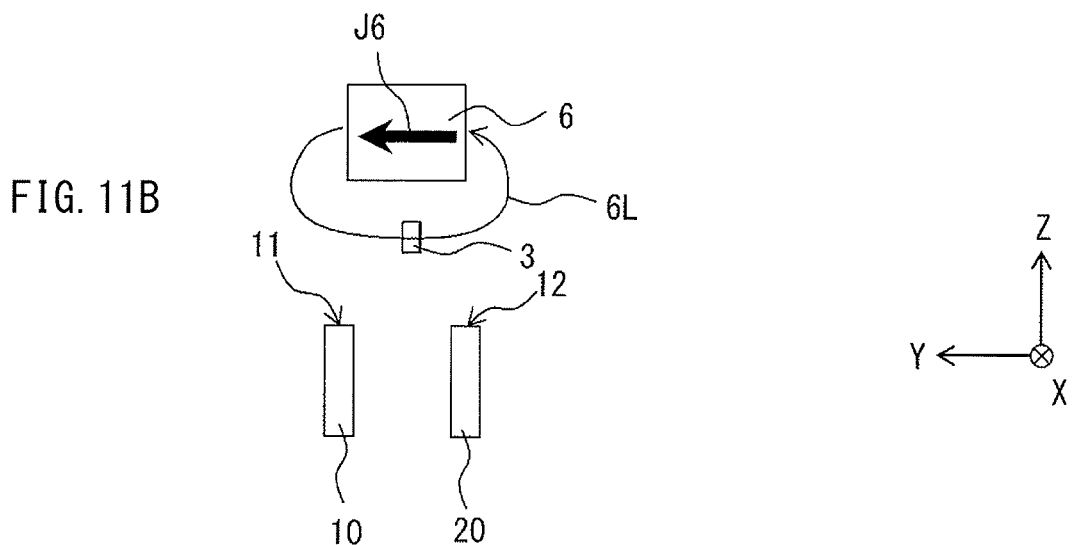
FIG. 11B

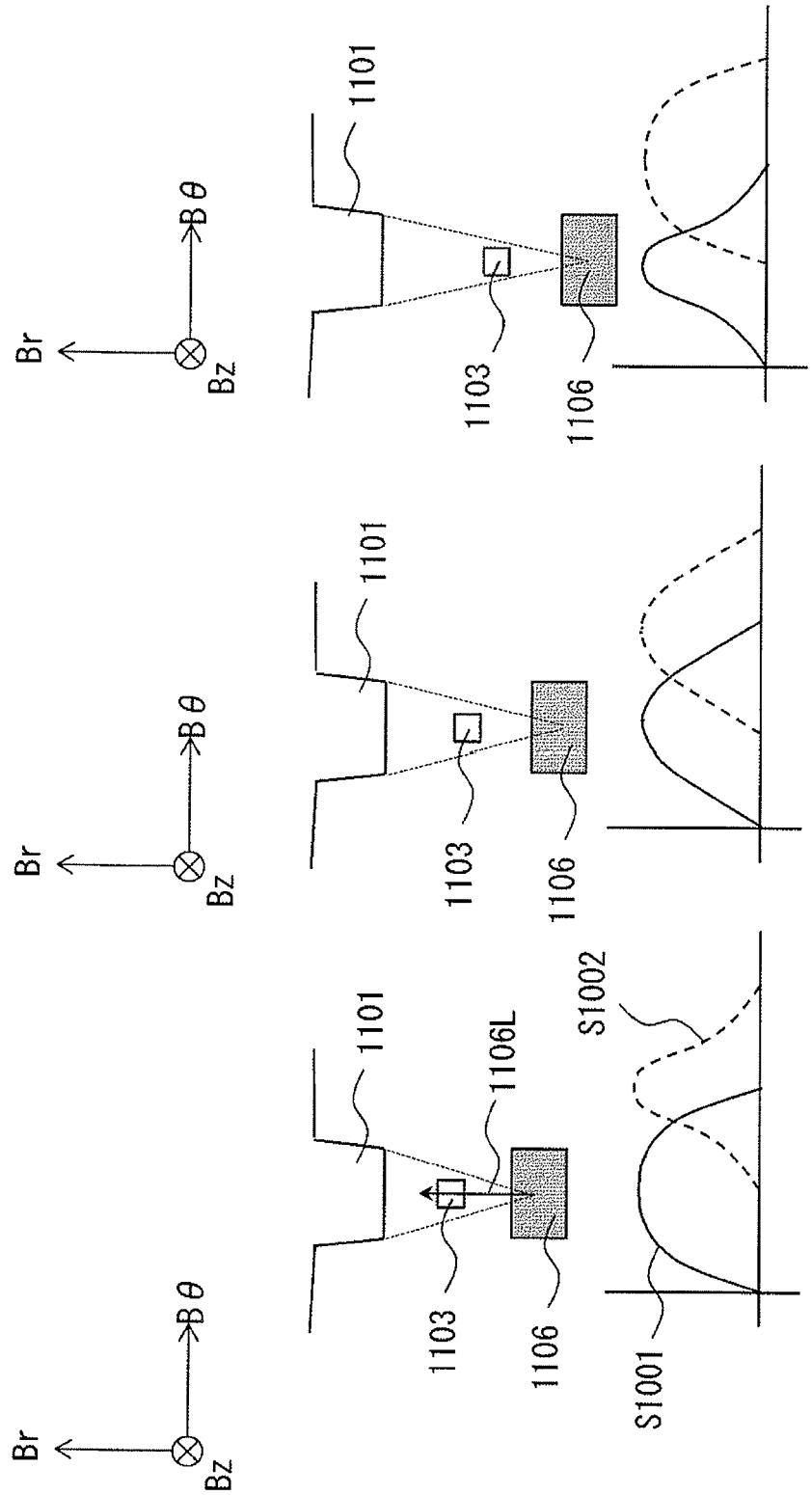

POSITION DETECTION SYSTEM

CROSS REFERENCE TO RELATED APPLICATIONS

This application claims the benefit of Japanese Priority Patent Application Nos. 2018-155642 filed on Aug. 22, 2018 and 2019-052941 filed on Mar. 20, 2019, and the entire contents of each of which are incorporated herein by reference.

BACKGROUND

The disclosure relates to a position detection system that detects a position of an object by detecting a change in magnetic field in association with a movement of the object.

The Applicant has proposed a magnetic position detection device that includes a magnetism sensing element and a line of magnetic members opposed to the magnetism sensing element. The magnetic position detection device makes it possible to uniquely identify the position of the magnetism sensing element relative to the magnetic members. Reference is made to Japanese Patent No. 5013146, for example.

SUMMARY

A position detection system according to one embodiment of the disclosure includes a first magnet, a first soft ferromagnetic member, and a magnetic detector. The first magnet has a magnetization magnetized in a first direction and generates a first magnetic field including a first magnetic line. The first soft ferromagnetic member extends along a second direction orthogonal to the first direction, is rectilinearly movable along the second direction with respect to the first magnet and includes a first outer edge having an uneven shape. The first outer edge has a first outer edge part and a second outer edge part. The first outer edge part is remote from the first magnet by a first distance in a third direction orthogonal to the first direction and the second direction. The second outer edge part is remote from the first magnet by a second distance in the third direction. The first outer edge part and the second outer edge part are disposed at different positions in the second direction. The magnetic detector is kept at a predetermined constant position relative to the first magnet. The first magnetic line passes through the magnetic detector in the first direction when the first soft ferromagnetic member is at rest.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

FIG. 11A is a second explanatory diagrams each schematically illustrating a change of the magnetic line during the operation of the position detection system illustrated in FIGS. 9A and 9B.

FIG. 11B is a second explanatory diagrams each schematically illustrating a change of the magnetic line during the operation of the position detection system illustrated in FIGS. 9A and 9B.

FIG. 29A is a front view of a portion of a rotation detection system having an example configuration according to one reference example.

FIG. 29B is a front view of a portion of a rotation detection system having an example configuration according to one reference example.

FIG. 29C is a front view of a portion of a rotation detection system having an example configuration according to one reference example.

DETAILED DESCRIPTION

Figure 1:
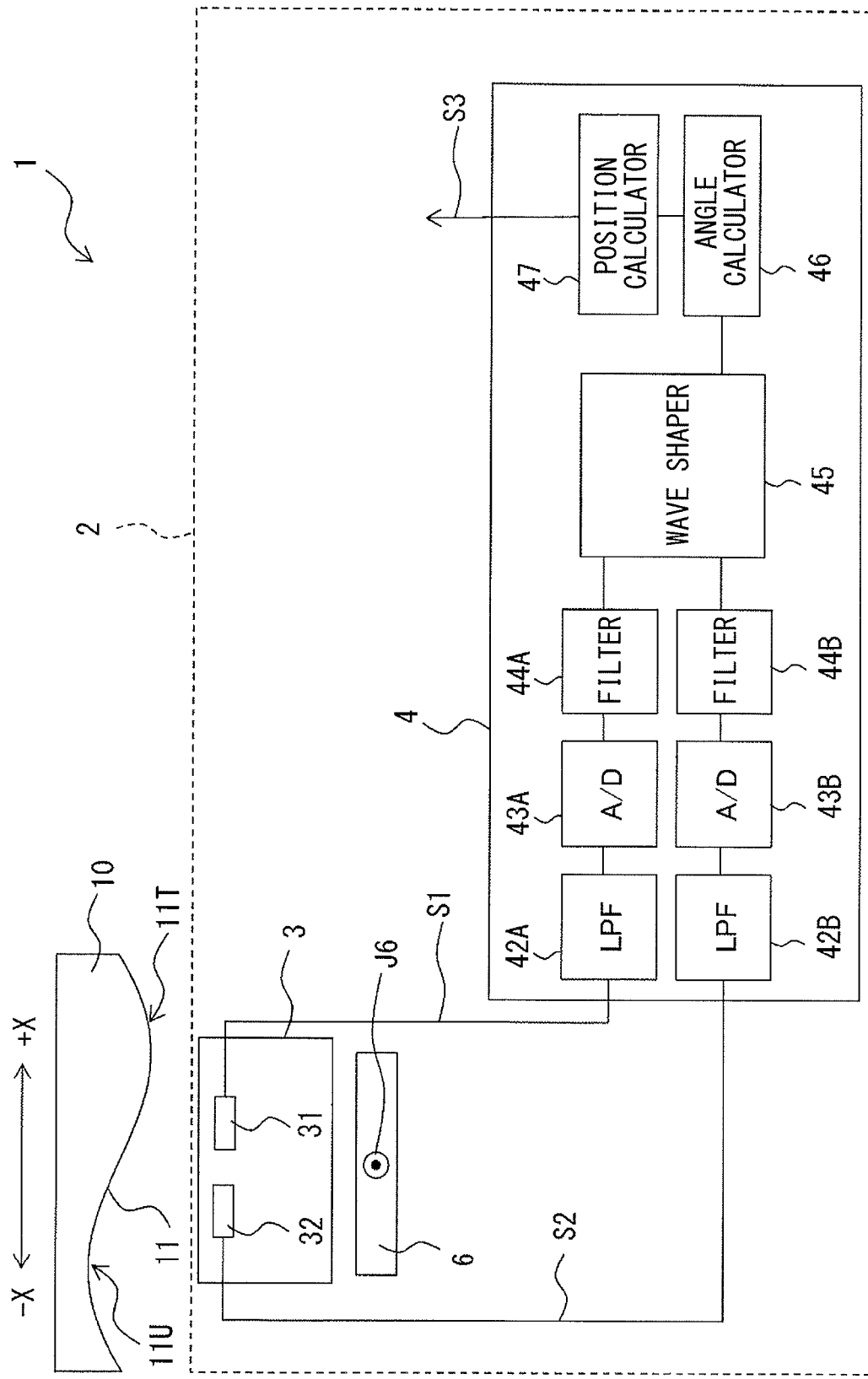
FIG. 1 is a diagram schematically illustrating an example overall configuration of a position detection system according to one embodiment of the disclosure.

In general, a detection angle of a magnetism sensing element is limited to 0° to 360°. Thus, a displacement of an object to be detected should be smaller than an arrangement pitch at which magnetic members are disposed, in the magnetic position detection device disclosed in Japanese Patent No. 5013146 described above, for example. Accordingly, as the displacement of the object to be detected becomes larger, the arrangement pitch at which the magnetic members are inevitably enlarged.

It is desirable to provide a position detection system having a compact configuration and making it possible to detect a position of a moving object with higher accuracy.

In the following, some example embodiments of the disclosure are described in detail, in the following order, with reference to the accompanying drawings. Note that the following description is directed to illustrative examples of the disclosure and not to be construed as limiting the disclosure. Factors including, without limitation, numerical values, shapes, materials, components, positions of the components, and how the components are coupled to each other are illustrative only and not to be construed as limiting the disclosure. Further, elements in the following example embodiments which are not recited in a most-generic independent claim of the disclosure are optional and may be provided on an as-needed basis. The drawings are schematic and are not intended to be drawn to scale. Note that the like elements are denoted with the same reference numerals, and any redundant description thereof will not be described in detail. Note that the description is given in the following order.

1. First Embodiment
    Example Position Detection System Generating Magnetic Field by Single Magnet and Detecting Position in One Axis Direction of Single Magnetic Yoke.
2. Second Embodiment
    Example Position Detection System Generating Magnetic Field by Single Magnet and Detecting Positions in One Axis Direction of Two Magnetic Yokes Rectilinearly Moving in Synchronization with Each Other
3. Third Embodiment
    Example Position Detection System Generating Magnetic Fields by Two Magnets and Detecting Positions in One Axis Direction of Two Magnetic Yokes Rectilinearly Moving in Synchronization with Each Other
4. Modification Examples of First to Third Embodiments
5. Fourth Embodiment
    Example Position Detection System Generating Magnetic Field by Single Magnet and Detecting Rotation Angle of Single Rotary Yoke
6. Fifth Embodiment
    Example Position Detection System Generating Magnetic Fields by Two Magnets and Detecting Rotation Angle of Single Rotary Yoke
7. Sixth Embodiment
    Example Position Detection System Generating Magnetic Field by Single Magnet and Detecting Rotation Angles of Two Rotary Yokes Rotating in Synchronization with Each Other
8. Seventh Embodiment
    Example Position Detection System Generating Magnetic Fields by Two Magnets and Detecting Rotation Angles of Two Rotary Yokes Rotating in Synchronization with Each Other
9. Modification Examples of Fourth to Seventh Embodiments

First Embodiment

[Configuration of Position Detection System]

Figure 2:
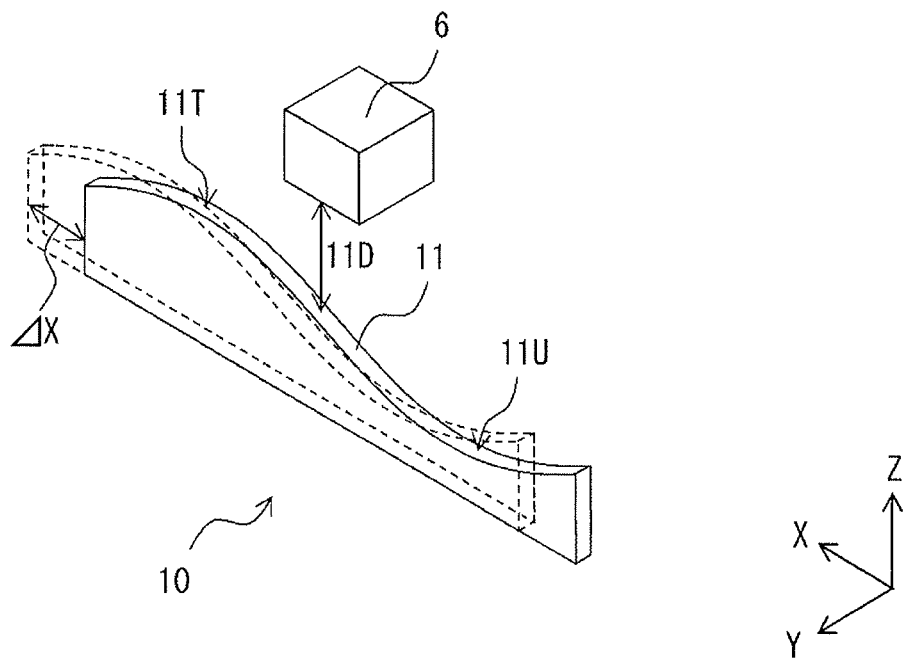
FIG. 2 is a schematic perspective view of a portion of the position detection system illustrated in FIG. 1.
Figure 3:
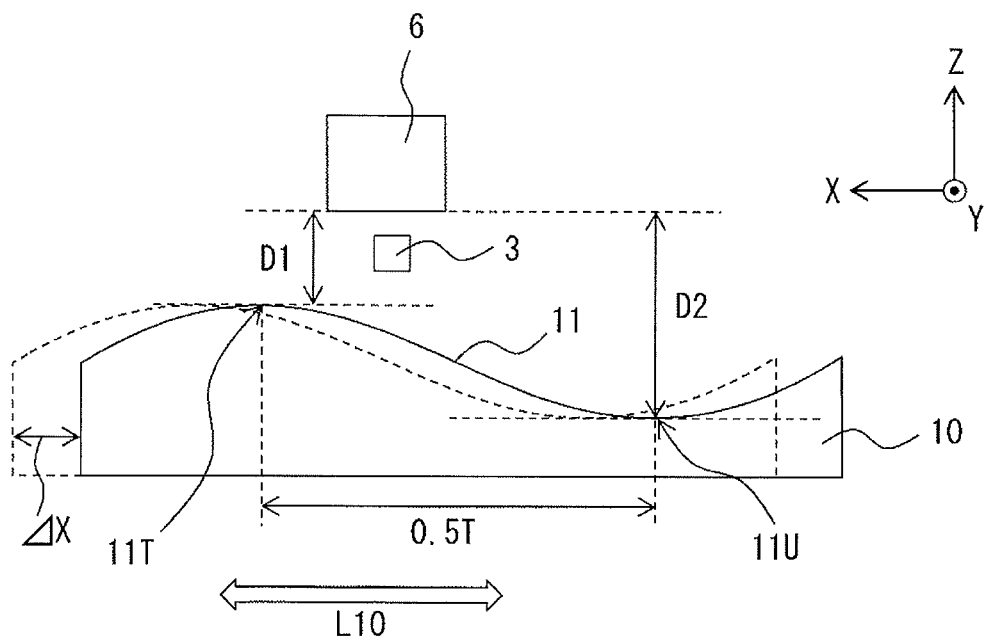
FIG. 3 is a schematic front view of a portion of the position detection system illustrated in FIG. 1.

An example configuration of a position detection system 1 according to a first embodiment of the disclosure will now be described with reference to FIGS. 1 to 3. FIG. 1 is a block diagram schematically illustrating an example overall configuration of the position detection system 1. FIG. 2 is a perspective view of main components of the position detection system 1. FIG. 3 is a front view of the main components of the position detection system 1. In FIG. 2, only a magnetic yoke 10 and a magnet 6, which are described below, are illustrated. In FIG. 3, only the magnetic yoke 10, the magnet 6, and a sensor 3, which are described below, are illustrated.

With reference to FIG. 1, the position detection system 1 may include the magnetic yoke 10 and a detection module 2. The magnetic yoke 10 may be fixed to a moving object to be measured. The detection module 2 may detect a position of the magnetic yoke 10 in an X-axis direction. The position detection system 1 may correspond to a specific but non-limiting example of a position detection system according to one embodiment of the disclosure.

[Magnetic Yoke 10]

The magnetic yoke 10 may be a plate member having a longitudinal side extending along the X-axis direction and a thickness in a Y-axis direction orthogonal to the X-axis direction. The magnetic yoke 10 is rectilinearly movable in a +X direction and a −X direction along the X-axis with respect to the detection module 2 including the magnet 6. The magnetic yoke 10 has an outer edge 11 opposed to the sensor 3 and the magnet 6 in the detection module 2 in a Z-axis direction. The Z-axis direction is orthogonal to the X-axis direction and the Y-axis direction. The outer edge 11 is remote from the magnet 6 by a distance 11D, for example, in the Z-axis direction, as illustrated in FIG. 2. The outer edge 11 has a non-flat or uneven shape with a protrusion 11T and a depression 11U, for example. For example, the outer edge 11 may have a shape defining a distance with respect to the magnet 6 in the Z-axis direction, and the distance changes cyclically in the X-axis direction to define a sine curve, for example. In other words, the outer edge 11 may have a continuous curved face. The protrusion 11T is remote from the magnet 6 by a first distance D1 in the Z-axis direction. The protrusion 11T may correspond to a specific but non-limiting example of a first outer edge part according to one embodiment of the disclosure. The depression 11U is remote from the magnet 6 by a second distance D2 in the Z-axis direction. The depression 11U may correspond to a specific but non-limiting example of a second outer edge part according to one embodiment of the disclosure. The protrusion 11T and the depression 11U are disposed at different positions in the X-axis direction. In the first embodiment, the first distance D1 may be a minimum value of the distance 11D, and the second distance D2 may be a maximum value of the distance 11D. The length from the protrusion 11T to the depression 11U in the X-axis direction may correspond to 0.5T, which corresponds to a half-cycle length of the sine curve defined by the outer edge 11. The magnetic yoke 10 may mainly, but not necessarily limited to mainly, include a soft ferromagnetic material, such as Permalloy.

With reference to FIG. 3, for example, a movable length L10 along which the magnetic yoke 10 is movable in the X-axis direction may be equal to or less than 1T, which corresponds to a one-cycle length of the outer edge 11 in the X-axis direction. This facilitates identification of an absolute position in the X-axis direction of the magnetic yoke 10 serving as a moving object. The start point and the end point of the movable length L10 may be respectively identical to the position of the protrusion 11T and the position of the depression 11U in the X-axis direction. Alternatively, the start point and the end point of the movable length L10 may be different from the positions of the protrusion 11T and the depression 11U in the X-axis direction.

Moving the magnetic yoke 10 along the X-axis may cause a cyclic change of a magnetic line 6L (described below) of a magnetic field imparted from the magnet 6 to the sensor 3. The magnetic yoke 10 may correspond to a specific but non-limiting example of a first soft ferromagnetic member according to one embodiment of the disclosure.

[Detection Module 2]

Figure 4:
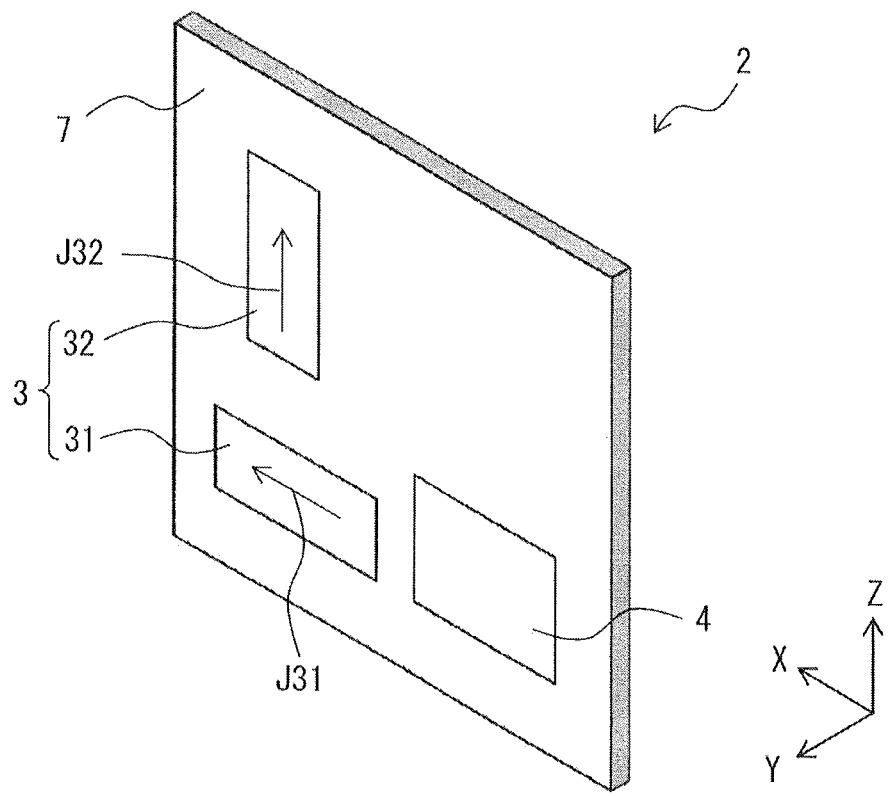
FIG. 4 is a schematic perspective view of a portion of the detection module illustrated in FIG. 1.

The detection module 2 may include the sensor 3, an operation circuit 4, and the magnet 6. In this non-limiting embodiment, the sensor 3 and the operation circuit 4 in the detection module 2 may be disposed on a single substrate 7, as illustrated in FIG. 4. Alternatively, the sensor 3 and the operation circuit 4 may be respectively disposed on different substrates. FIG. 4 is a schematic perspective view of a portion of the detection module 2 illustrated in FIG. 1. The sensor 3 may correspond to a specific but non-limiting example of a magnetic detector according to one embodiment of the disclosure. The magnet 6 may correspond to a specific but non-limiting example of a first magnet according to one embodiment of the disclosure.

[Sensor 3]

As illustrated in FIG. 1, the sensor 3 may include magnetic sensors 31 and 32. The magnetic sensor 31 may detect a change of the magnetic line 6L (described below) of the magnetic field in association with a movement of the magnetic yoke 10 in the +X direction or −X direction and output a first signal S1 to the operation circuit 4. Likewise, the magnetic sensor 32 may detect a change of the magnetic line 6L of the magnetic field in association with the movement of the magnetic yoke 10 and output a second signal S2 to the operation circuit 4. The magnetic sensor 31 may correspond to a specific but non-limiting example of a first magnetism detection device according to one embodiment of the disclosure. The magnetic sensor 32 may correspond to a specific but non-limiting example of a second magnetism detection device according to one embodiment of the disclosure.

With reference to FIG. 4, the magnetic sensor 31 may have a detection axis J31 extending along the X-axis direction, and the magnetic sensor 32 may have a detection axis J32 extending along the Z-axis direction substantially orthogonal to the detection axis J31. The first signal S1 and the second signal S2 may thus have phases different from each other. In an example case where the first signal S1 is indicative of a resistance based on sin θ, with respect to the displacement ΔX (refer to FIGS. 2 and 3) of the magnetic yoke 10 in the X-axis direction, the second signal S2 may be indicative of a resistance based on cos θ.

Figure 5:
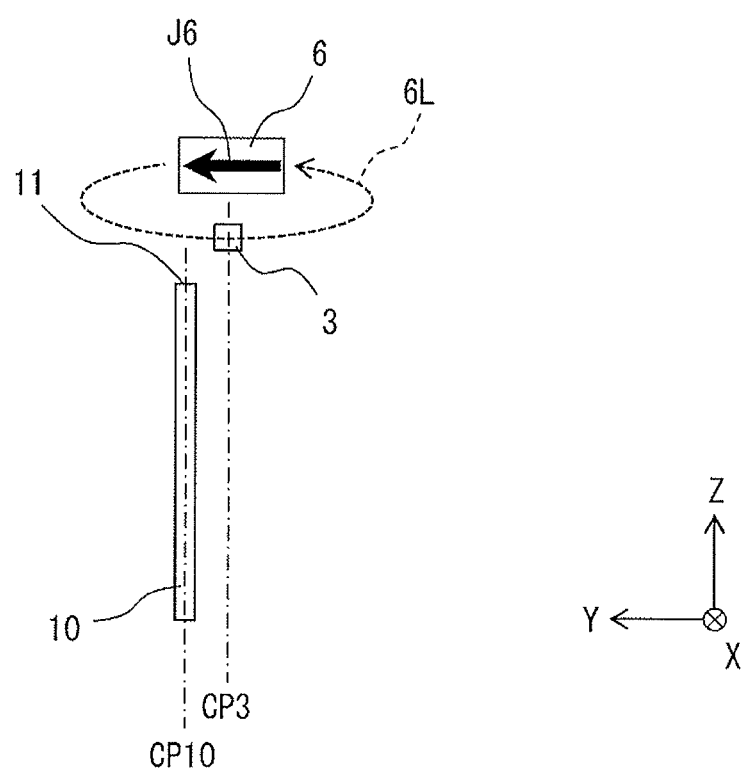
FIG. 5 is a schematic side view of a portion of the position detection system illustrated in FIG. 1.

FIG. 5 is a schematic perspective view a portion of the detection module 2. As illustrated in FIG. 5, the sensor 3 may be disposed between the magnet 6 and the magnetic yoke 10 that are opposed to each other in the Z-axis direction. The sensor 3 may be separated from the magnet 6 and the magnetic yoke 10. Additionally, a center position CP3 of the sensor 3 in the Y-axis direction and a center position CP10 of the magnetic yoke 10 in the Y-axis direction may be different from each other in the Y-axis direction. In the first embodiment, for example, the sensor 3 may be positioned so as not to overlap the position of the magnetic yoke 10 in the Z-axis direction.

Figure 6:
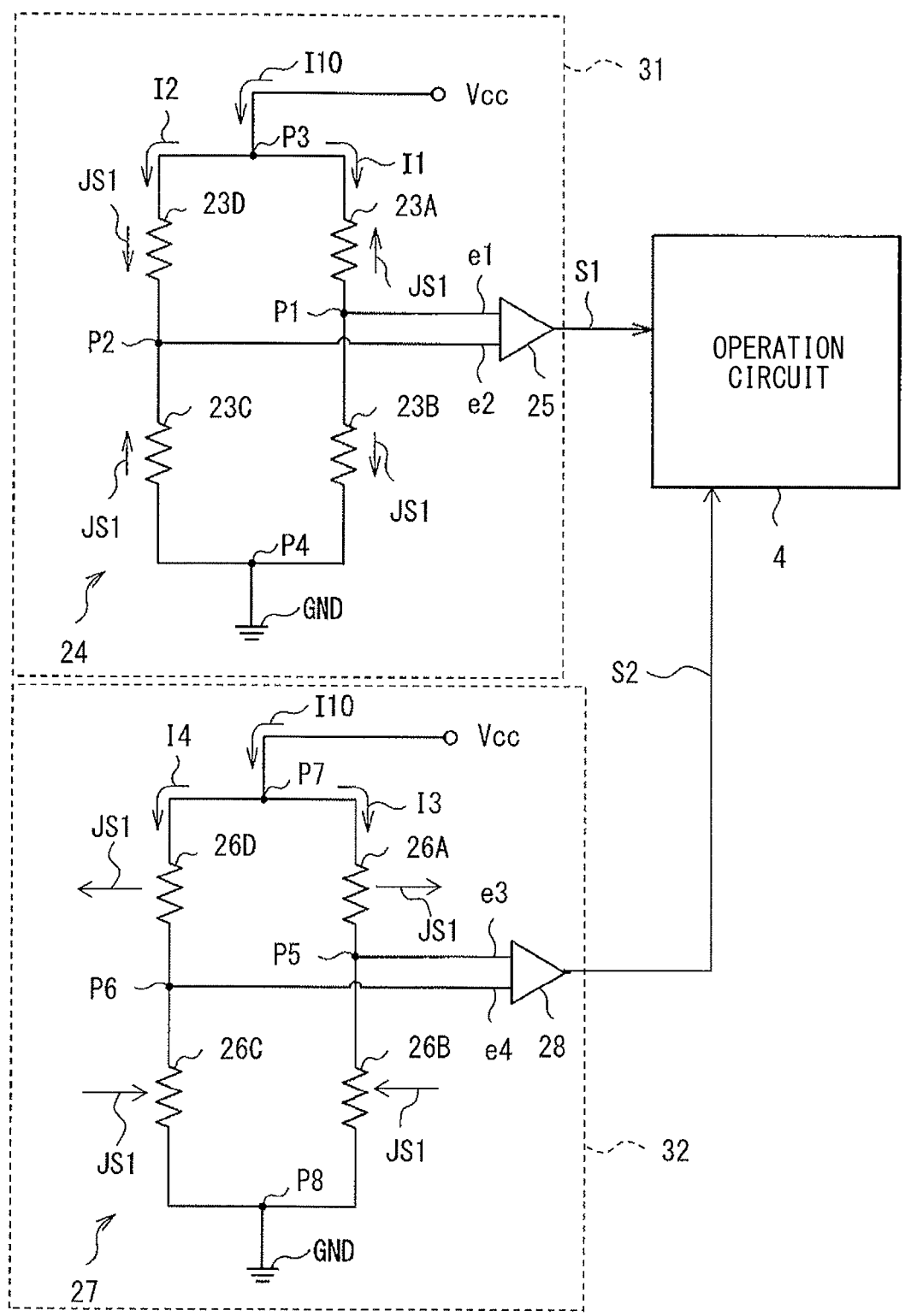
FIG. 6 is a circuit diagram of a magnetic sensor illustrated in FIG. 4.

FIG. 6 is a circuit diagram of the sensor 3. As illustrated in FIG. 6, the magnetic sensor 31 may include a Wheatstone bridge circuit (hereinafter simply referred to as a bridge circuit) 24 and a differential detector 25. The bridge circuit 24 may include four magneto-resistive effect (MR) elements 23 (23A to 23D), for example. Likewise, the magnetic sensor 32 may include a bridge circuit 27 and a differential detector 28. The bridge circuit 27 may include four MR elements 26 (26A to 26D), for example.

In the bridge circuit 24, the MR element 23A and the MR element 23B may be coupled at a node P1 at their one ends, and the MR element 23C and the MR element 23D may be coupled at a node P2 at their one ends. The MR element 23A and the MR element 23D may be coupled at a node P3 at their other ends, and the MR element 23B and the MR element 23C may be coupled at a node P4 at their other ends. The node P3 may be coupled to a power Vcc, and the node P4 may be grounded. Each of the nodes P1 and P2 may be coupled to an input terminal of the differential detector 25. The differential detector 25 may detect a potential difference between the node P1 and the node P2 (i.e., a difference in voltage drop between the MR element 23A and the MR element 23D) when a voltage is applied between the node P3 and the node P4. Thereafter, the differential detector 25 may output the first signal S1 indicative of the potential difference to the operation circuit 4. Likewise, in the bridge circuit 27, the MR element 26A and the MR element 26B may be coupled at a node P5 at their one ends, and the MR element 26C and the MR element 26D may be coupled at a node P6 at their one ends. The MR element 26A and the MR element 26D may be coupled at a node P7 at their other ends, and the MR element 26B and the MR element 26C may be coupled at a node P8 at their other ends. The node P7 may be coupled to the power Vcc, and the node P8 may be grounded. Each of the nodes P5 and P6 may be coupled to an input terminal of the differential detector 28. The differential detector 28 may detect a potential difference between the node P5 and the node P6 (i.e., a difference in voltage drop between the MR element 26A and the MR element 26D) when a voltage is applied between the node P7 and the node P8. Thereafter, the differential detector 28 may output the second signal S2 indicative of the potential difference to the operation circuit 4.

Arrows JS1 in FIG. 6 schematically illustrate respective directions of magnetization of magnetization fixed layers SS1 (described below) in the MR elements 23A to 23D and 26A to 26D. As illustrated by these arrows, the resistance of the MR elements 23A and 23C may change (i.e., increase or decrease) in the same direction in accordance with a change in an external magnetic field. The resistance of the MR elements 23B and 23D may change (i.e., decrease or increase) in a direction opposite to the direction for the MR elements 23A and 23C in accordance with the change in the external magnetic field. Additionally, the resistance of the MR elements 26A and 26C may change in accordance with the change in the external signal magnetic field. The change of the resistance of the MR elements 26A and 26C may be shifted in phase by 90 degrees with respect to the change in the resistance of the MR elements 23A to 23D. The resistance of the MR elements 26B and 26D may change in accordance with a change in the signal magnet field in a direction opposite to the direction for the MR elements 26A and 26C. The movement of the magnetic yoke 10 and the behavior of the resistance of the MR elements may thus have a following relation, for example: when the magnetic yoke 10 moves through a certain angle, the resistance of the MR elements 23A and 23C may increase, whereas the resistance of the MR elements 23B and 23D may decrease. In this case, the change in the resistance of the MR elements 26A and 26C may be delayed (or advanced) by 90 degrees with respect to the change in the resistance of the MR elements 23A and 23C. Additionally, the change in the resistance of the MR elements 26B and 26D may be delayed (or advanced) by 90 degrees with respect to the change of the resistance of the MR elements 23B and 23D.

Figure 7:
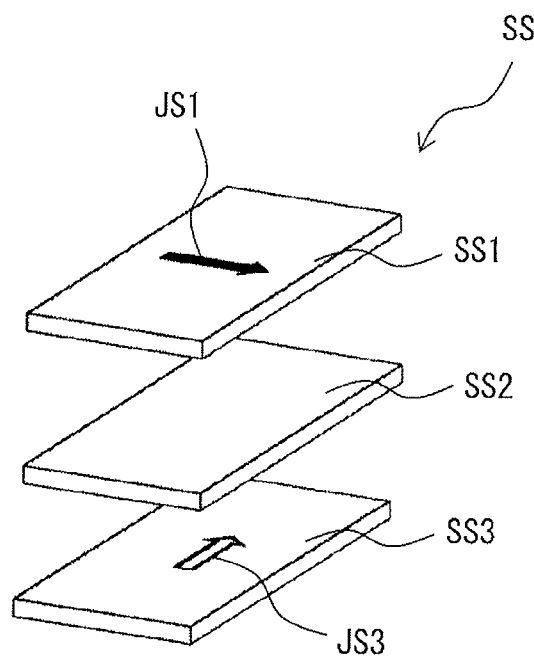
FIG. 7 is an enlarged exploded perspective view of a portion of the magnetic sensor illustrated in FIG. 4.

FIG. 7 illustrates an example sensor stack SS that serves as a portion of the MR elements 23 and 26. The sensor stacks SS of the MR elements 23 and 26 may have substantially the same structure. As illustrated in FIG. 7, the sensor stack SS may have a spin-valve structure in which several functional layers including a magnetic layer are stacked. For example, the sensor stack SS may include a magnetization fixed layer SS1, a middle layer SS2, and a magnetization free layer SS3 that are stacked in this order. The magnetization fixed layer SS1 may have magnetization JS1 fixed in a predetermined direction. The middle layer SS2 may not generate magnetization fixed in a specific direction. The magnetization free layer SS3 may have magnetization JS3 that changes depending on the magnetic flux density of a signal magnetic field. Note that FIG. 6 illustrates an unloaded condition where an external magnetic field, such as a magnetic field generated by the magnet 6, is not imparted. The magnetization fixed layer SS1, the middle layer SS2, and the magnetization free layer SS3 may each have a single-layer structure or a multi-layer structure that includes several layers.

The magnetization fixed layer SS1 may include a ferromagnetic material, such as cobalt (Co), cobalt-iron alloy (CoFe), or cobalt-iron-boron alloy (CoFeB). Optionally, a non-illustrated antiferromagnetic layer may be provided adjacent to one side, remote from the middle layer SS2, of the magnetization fixed layer SS1. The antiferromagnetic layer may include an antiferromagnetic material, such as platinum-manganese alloy (PtMn) or iridium-manganese alloy (IrMn). The antiferromagnetic layer may be in a state where, for example, a spin magnetic moment in a positive direction and a spin magnetic moment in a negative direction cancel each other out completely. The antiferromagnetic layer may fix the magnetization JS1 of the adjacent layer or the magnetization fixed layer SS1 in the positive direction.

In an embodiment where the sensor stack SS has a magnetic-tunnel-junction (MTJ) spin-valve structure, the middle layer SS2 may be a non-magnetic tunnel-barrier layer that includes, for example, magnesium oxide (MgO) and that is thin enough to pass a quantum-mechanical tunneling current. The tunnel-barrier layer including MgO may be formed through a sputtering process using a MgO target, an oxidation treatment on a magnesium (Mg) thin film, or reactive sputtering of magnesium in an oxygen atmosphere. Alternatively, the middle layer SS2 may include an oxide or a nitride of aluminum (Al), tantalum (Ta), or hafnium (Hf), in place of MgO. Still alternatively, the middle layer SS2 may include a platinum group metal, such as ruthenium (Ru) or gold (Au), or a non-magnetic metal, such as copper (Cu). In this case, the spin-valve structure may serve as a giant magneto-resistive effect (GMR) film.

The magnetization free layer SS3 may be a soft ferromagnetic layer that includes cobalt-iron alloy (CoFe), nickel-iron alloy (NiFe), or cobalt-iron-boron alloy (CoFeB), for example.

In the bridge circuit 24 of the magnetic sensor 31, a current I10 from the power Vcc may be divided into a current I1 and a current I2 at the node P3, and the current I1 or the current I2 may be supplied to each of the MR elements 23A to 23D. Signals e1 and e2 extracted from the respective nodes P1 and P2 of the bridge circuit 24 may flow in the differential detector 25. For example, when the magnetization JS1 and the magnetization JS3 define an angle of $\gamma$, the signal e1 may be indicative of a change in resistance in accordance with the expression, $A\cos(+\gamma)+B$, and the signal e2 may be indicative of a change in resistance in accordance with the expression, A cos(−γ)+B, where A and B are constants. Meanwhile, in the bridge circuit 27 of the magnetic sensor 32, a current I10 from the power Vcc may be divided into a current I3 and a current I4 at the node P7, and the current I3 or the current I4 may be supplied to each of the MR elements 26A to 26D. Signals e3 and e4 extracted from the respective nodes P5 and P6 of the bridge circuit 27 may flow in the differential detector 28. The signal e3 may be indicative of a change in resistance in accordance with the expression, A sin(+γ)+B, and the signal e4 may be indicative of a change in resistance in accordance with the expression, A sin(−γ)+B. Additionally, the first signal S1 from the differential detector 25 and the second signal S2 from the differential detector 28 may flow in the operation circuit 4. The operation circuit 4 may calculate a resistance based on tanγ, where "γ" corresponds to the displacement ΔX of the magnetic yoke 10 with respect to the sensor 3. The displacement ΔX may thus be determined in the operation circuit 4.

[Operation Circuit 4]

As illustrated in FIG. 1, the operation circuit 4 may include low-pass filters (LPF) 42A and 42B, A/D converters 43A and 43B, filters 44A and 44B, a waveform shaper 45, an angle calculator 46, and a position calculator 47, for example.

The low-pass filter 42A may be coupled to the magnetic sensor 31 so as to receive the first signal S1 from the magnetic sensor 31. The first signal S1 received at the low-pass filter 42A may be transmitted to the waveform shaper 45 via the A/D converter 43A and the filter 44A. Likewise, the low-pass filter 42B may be coupled to the magnetic sensor 32 so as to receive the second signal S2 from the magnetic sensor 32. The second signal S2 received at the low-pass filter 42B may be transmitted to the waveform shaper 45 via the A/D converter 43B and the filter 44B.

The waveform shaper 45 may shape the waveform of the first signal S1 received from the magnetic sensor 31 and the waveform of the second signal S2 received from the magnetic sensor 32, for example. The waveform shaper 45 may include a detection circuit and a compensation circuit, for example. The detection circuit may detect a difference in offset voltage, a difference in amplitude, and a difference in relative position between the magnetic sensor 31 and the magnetic sensor 32 with respect to the magnetic yoke 10. The compensation circuit may compensate these differences.

The angle calculator 46 and the position calculator 47 may each be an integrated circuit (IC) that calculates the displacement ΔX of the magnetic yoke 10 along the X-axis direction on the basis of the first signal S1 and the second signal S2. The angle calculator 46 may calculate a change in the angle of the magnetic line 6L on the basis of the first signal S1 and the second signal S2. The position calculator 47 may calculates the displacement ΔX of the magnetic yoke 10 on the basis of data on the change in the angle of the magnetic line L6 calculated by the angle calculator 46 and output a third signal S3 including the data on the displacement ΔX to the outside.

[Magnet 6]

The magnet 6 may be opposed to the magnetic yoke 10 across the sensor 3. The magnet 6 may impart the magnetic field including the magnetic line 6L to the magnetic yoke 10 and the sensor 3. The sensor 3 may cause the magnetic sensors 31 and 32 to detect a change in the direction of the magnetic line 6L. As illustrated in FIG. 5, the magnetic line 6L of the magnet filed imparted from the magnet 6 to the sensor 3 may extend along the Y-axis when passing through the sensor 3. The direction of the magnetic line 6L may change cyclically in accordance with a rectilinear movement of the magnetic yoke 10 in the X-axis direction. When the magnetic yoke 10 is at rest with respect to the magnet 6 and the sensor 3, the magnetic line 6L passing through the sensor 3 may be directed in the direction along the Y-axis, which is substantially orthogonal to the direction in which the magnetic yoke 10 moves. The direction along the Y-axis described herein should not be limited to a direction completely parallel to the Y-axis or a direction defining 0° with respect to the Y-axis and may be a direction defining ±30° or less with respect to the Y-axis, for example. In other words, although it is desirable that the center of the amplitude of the change in the direction of the magnetic line 6L be 0° at which the magnetic line 6L is completely parallel to the Y-axis, for example, the direction of the magnetic line 6L may be inclined at an angle of ±30° or less, for example, around the center of 0°. Although it is desirable that the amplitude of the change in the direction of the magnetic line 6L be as large as possible, an actual amplitude of the change in the direction of the magnetic line 6L may be about ±5°, for example. In the first embodiment, the direction of the magnetic line 6L passing through the sensor 3 may be substantially identical to the Y-axis direction when the depression 11U of the magnetic yoke 10 moves closest to the magnet 6. For example, the magnetization direction J6 of the magnet 6 may be substantially identical to the Y-axis direction.

[Operations and Workings of Position Detection System 1]

The position detection system 1 according to the first embodiment makes it possible to detect the displacement ΔX of the magnetic yoke 10 in the X-axis direction using the detection module 2 including the sensor 3, the operation circuit 4, and the magnet 6.

Figure 8A:
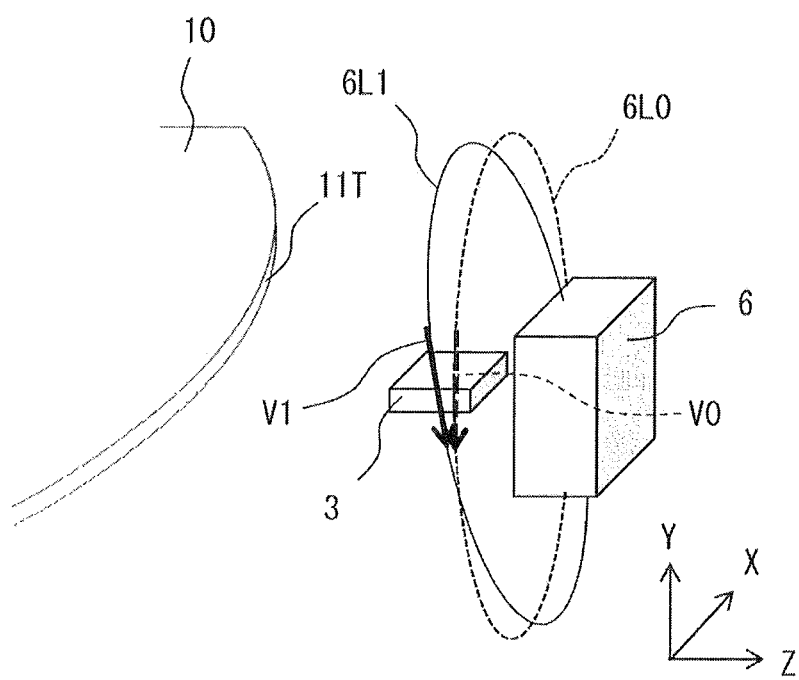
FIG. 8A is an explanatory diagram illustrating a behavior of the position detection system illustrated in FIG. 1.
Figure 8B:
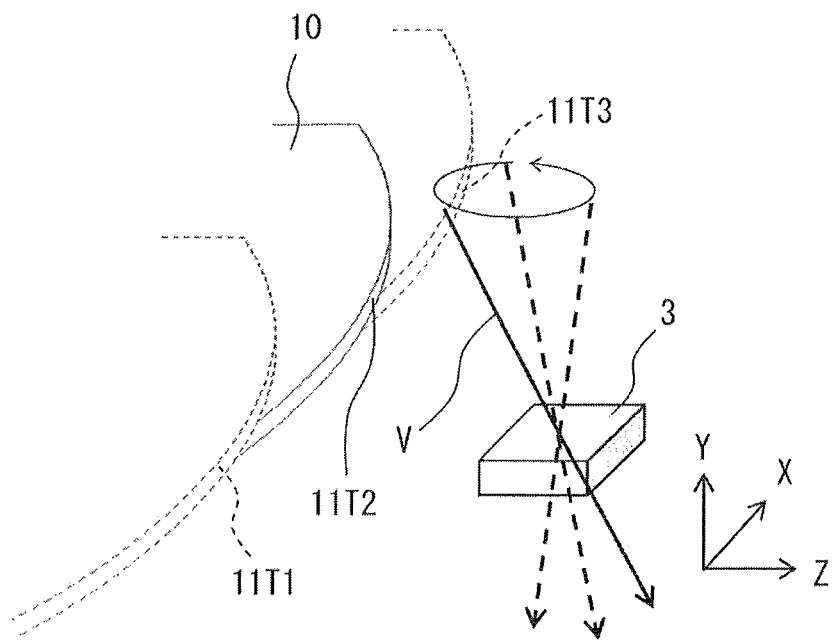
FIG. 8B is another explanatory diagram illustrating a behavior of the position detection system illustrated in FIG. 1.

In the position detection system 1, the protrusion 11T of the magnetic yoke 10 may move closer to and farther away from the magnet 6 in accordance with the rectilinear movement of the magnetic yoke 10 along the X-axis direction. In accordance with such an operation, the vector of the magnetic line 6L generated by the magnet 6 may sequentially change. In an example condition illustrated in FIG. 8A, for example, where the protrusion 11T of the magnetic yoke 10 is closer to the magnet 6, a magnetic line 6L1 generated by the magnet 6 may have a vector V1 that is slightly inclined with respect to the Y-axis direction. In contrast, in a condition where the depression 11U is closer to the magnet 6, a magnetic line 6L0 generated by the magnet 6 may have a vector V0 that is substantially identical to the Y-axis direction. The vector V of the magnetic line 6L may thus precess in accordance with the rectilinear movement of the magnetic yoke 10 along the X-axis direction or the sequential change in a relative position of the protrusion 1T with respect to the magnet 6, as illustrated in FIG. 8B. In FIG. 8B, the sequential movement of the protrusion 11T is illustrated by a protrusion 11T1, a protrusion 11T2, and a protrusion 11T3. In this case, the cycle in which the protrusion 11T moves closer to the magnet 6 may be identical to the cycle in which the vector V of the magnetic line 6L changes. The sensor 3 may output the first signal S1 including a component Br along the X-axis direction and the second signal S2 including a component Bz along the Z-axis direction. The operation circuit 4 may determine the displacement ΔX of the magnetic yoke 10 and the absolute position of the magnetic yoke 10 in the X-axis direction on the basis of the first signal S1 and the second signal S2.

[Effects of Position Detection System 1]

According to the position detection system 1 of the first embodiment of the disclosure, the magnetic yoke 10 is rectilinearly movable along the X-axis direction with respect to the sensor 3 and the magnet 6. The magnetic yoke 10 has the outer edge 11 having the protrusion 11T and the depression 11U. The protrusion 11T is remote from the magnet 6 by the first distance D1, and the depression 11U is remote from the magnet by the second distance D2. This configuration allows the sensor 3 to detect a slight change in the vector V of the magnetic line 6L of the magnet 6 in association with the movement of the magnetic yoke 10. Further, the vector V of the magnetic line 6L passing through the sensor 3 may be directed in the Y-axis direction substantially orthogonal to the X-axis direction in which the magnetic yoke 10 moves. This reduces an influence of the precision in the relative positions among the magnetic yoke 10, the sensor 3, and the magnet 6 on the waveform of an output signal from the sensor 3. Accordingly, the position detection system 1 according to the first embodiment of the disclosure makes it possible to accurately detect the displacement of the magnetic yoke 10 and the absolute position of the magnetic yoke 10 even when downsized.

Figure 14A:
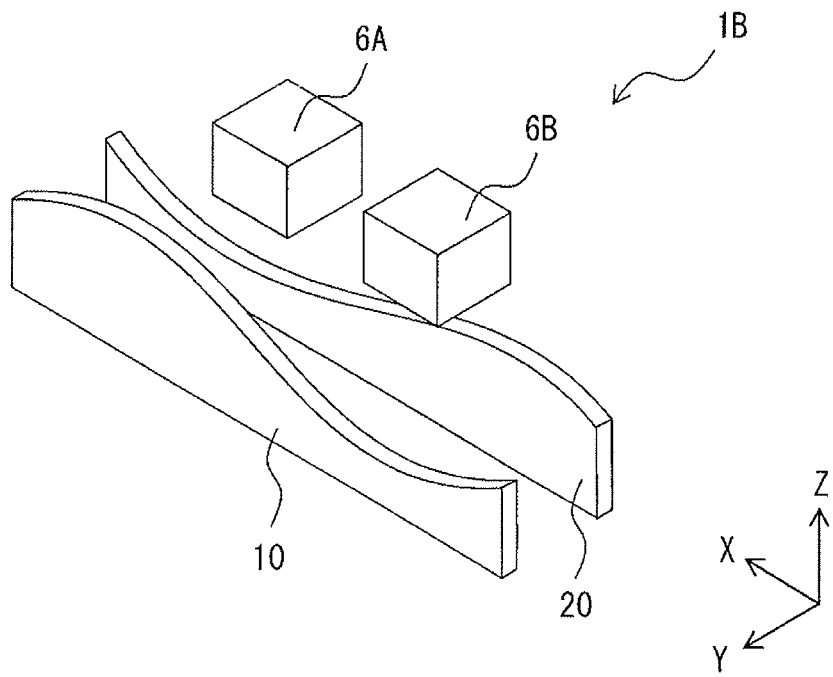
FIG. 14A is a schematic perspective view of a portion of a position detection system having an example configuration according to one embodiment.
Figure 14B:
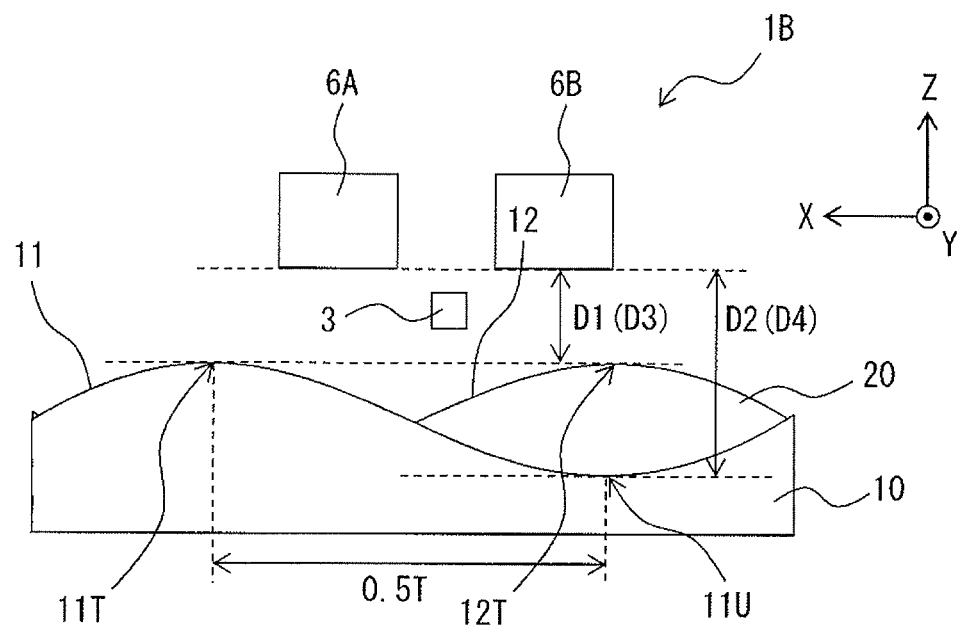
FIG. 14B is a schematic front view of a portion of the position detection system having the example configuration illustrated in FIG. 14A.
Figure 14C:
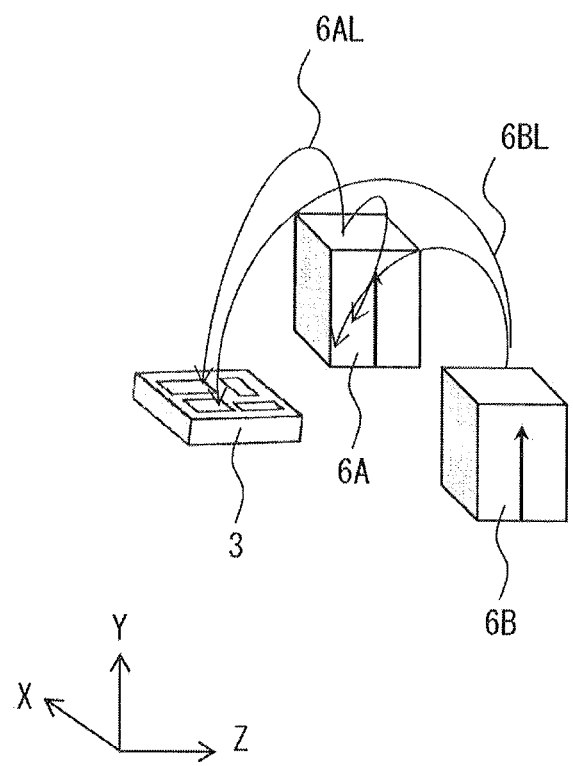
FIG. 14C is a schematic perspective view of a portion of the position detection system having the example configuration illustrated in FIG. 14A.
Figure 16:
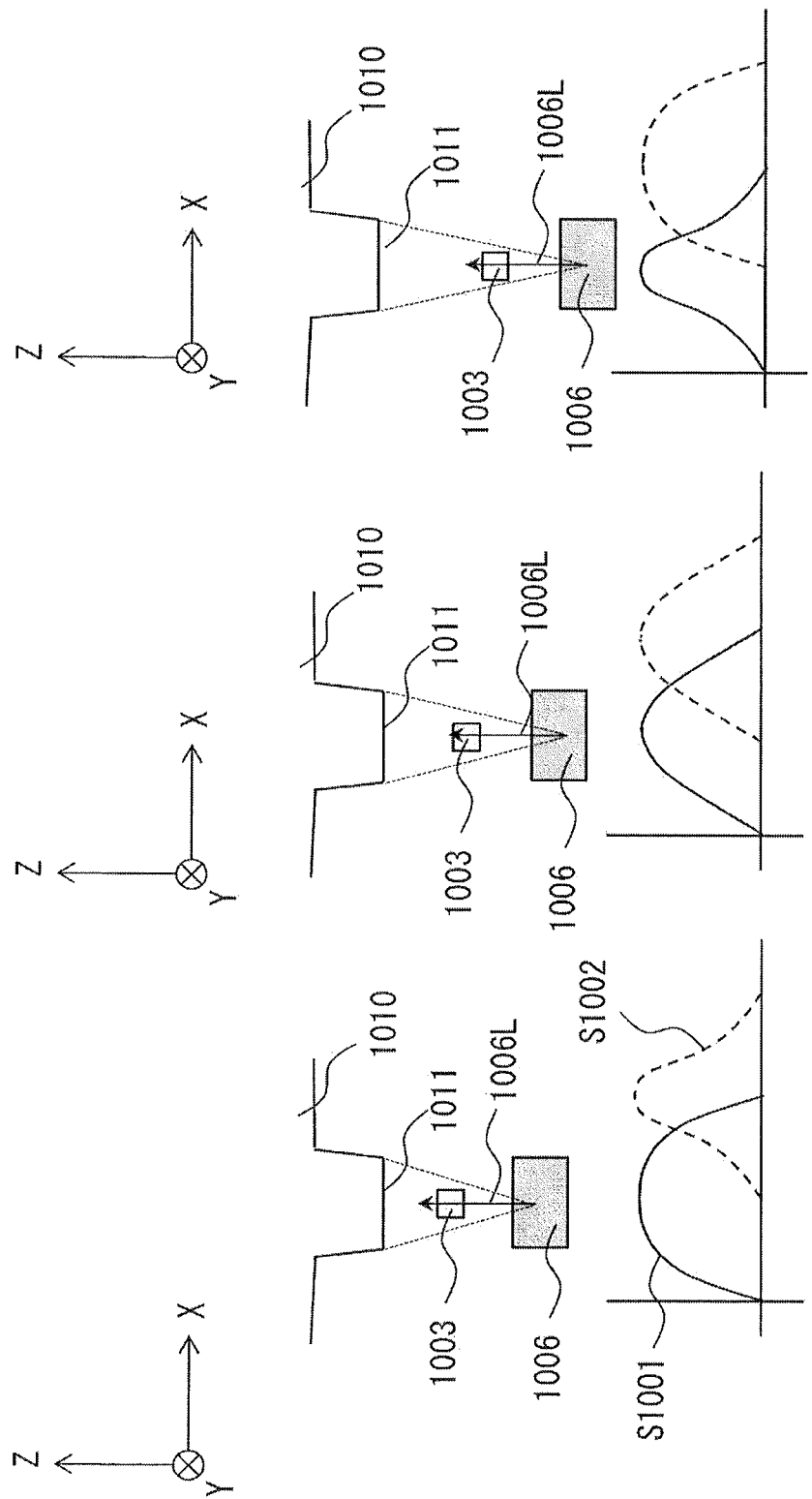
FIG. 16A is a schematic front view of a portion of a position detection system having an example configuration according to one reference example.
FIG. 16B is a schematic front view of a portion of a position detection system having an example configuration according to one reference example.
FIG. 16C is a schematic front view of a portion of a position detection system having an example configuration according to one reference example.

However, in a position detection system according to a first reference example illustrated in FIGS. 16A, 16B, and 16C, for example, a magnet 1006 generates a magnet line 1006L extending along the Z-axis direction in which the magnet 1006 and an outer edge 1011 of a magnetic yoke 1010 are opposed to each other. Unfortunately, the relative positions among the magnetic yoke 1010, a sensor 1003, and the magnet 1006 have a significant influence on the detection accuracy of the sensor 1003. For example, when the relative positions among the magnetic yoke 1010, the sensor 1003, and the magnet 1006 are appropriate, the waveform of a first signal S1001 and the waveform of a second signal S1002 are appropriate as illustrated in FIG. 16B. However, when the relative positions among the magnetic yoke 1010, the sensor 1003, and the magnet 1006 are slightly shifted in the Z-axis direction, the waveform of the first signal S1001 can deform as illustrated in FIG. 14A, for example, or the waveform of the second signal S1002 can deform as illustrated in FIG. 14C, for example. The position detection system according to the first reference example is also likely to decrease in detection accuracy due to the shift of the relative position of the magnetic yoke 1010 in the Z-axis direction.

In contrast, the position detection system 1 according to the first embodiment of the disclosure, the allowable range of the relative positions among the magnetic yoke 10, the sensor 3, and the magnet 6 may be larger than that in the position detection system according to the first reference example. The position detection system 1 according to the first embodiment of the disclosure is thus unlikely to decrease in detection accuracy due to the shift in relative positions among the magnetic yoke 10, the sensor 3, and the magnet 6, even when downsized.

Furthermore, in the position detection system 1 according to the first embodiment of the disclosure, the magnetic yoke 10 is moved which is fixed to the moving object to be measured. Magnetic powders, such as iron powders, are thus unlikely to adhere to the magnetic yoke 10, unlike the reference example in which a magnet is moved. Magnetic powders adhering to a magnet can have an influence on the direction of the magnetic line of the magnet, which can result in deterioration of the detection accuracy of the sensor. According to the position detection system 1 of the first embodiment of the disclosure, there is no need to move the magnet 6. This allows the magnet 6 to be disposed inside the detection module 2, which prevents adhesion of magnetic powders to the magnet 6. The concerns are thus alleviated resolved about the deterioration in detection accuracy of the sensor caused by the adhesion of magnetic powders to the magnet 6.

Furthermore, in the position detection system 1 according to the first embodiment of the disclosure, the sensor 3 is kept at a predetermined constant position relative to the magnet 6. This helps stably generating a magnetic field intensity required for a minimum operation of the sensor 3, which results in a superior operational stability of the sensor 3.

Furthermore, in the position detection system 1 according to the first embodiment of the disclosure, the magnet 6 is not be moved relative to the sensor 3. In other words, the distance between the sensor 3 and the magnet 6 is constant. This helps preventing the sensor 3 from decreasing in detection sensitivity depending on the movable range of the moving object to be measured. When the movable range of the moving object to be measured is large, the movable length L10 (illustrated in FIG. 3) of the magnetic yoke 10 in the X-axis direction may be enlarged. The movable length L10 in the X-axis direction may be adjusted by changing the cycle of the uneven shape of the magnetic yoke 10 in the X-axis direction.

2. Second Embodiment

Figure 9A:
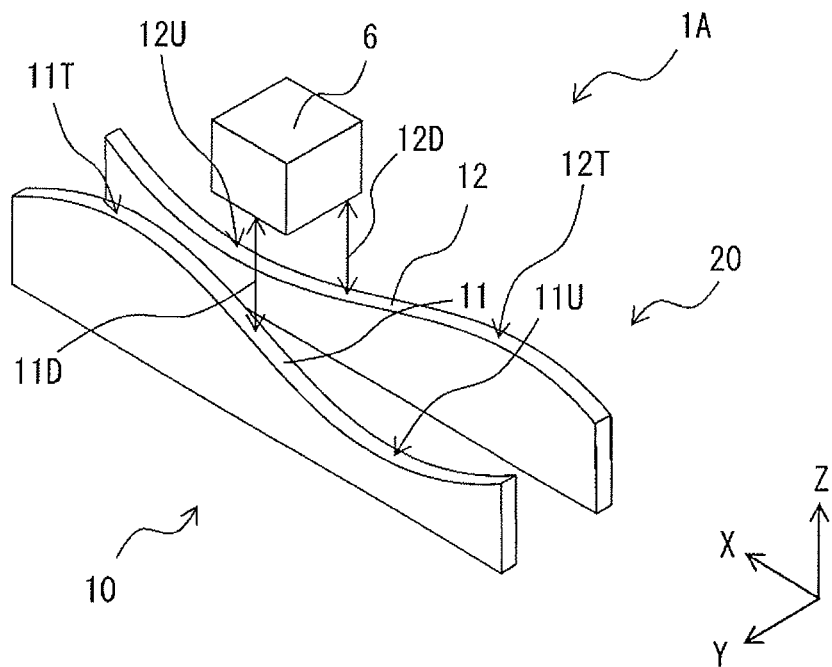
FIG. 9A is a schematic perspective view of a portion of a position detection system having an example configuration according to one embodiment.
Figure 9B:
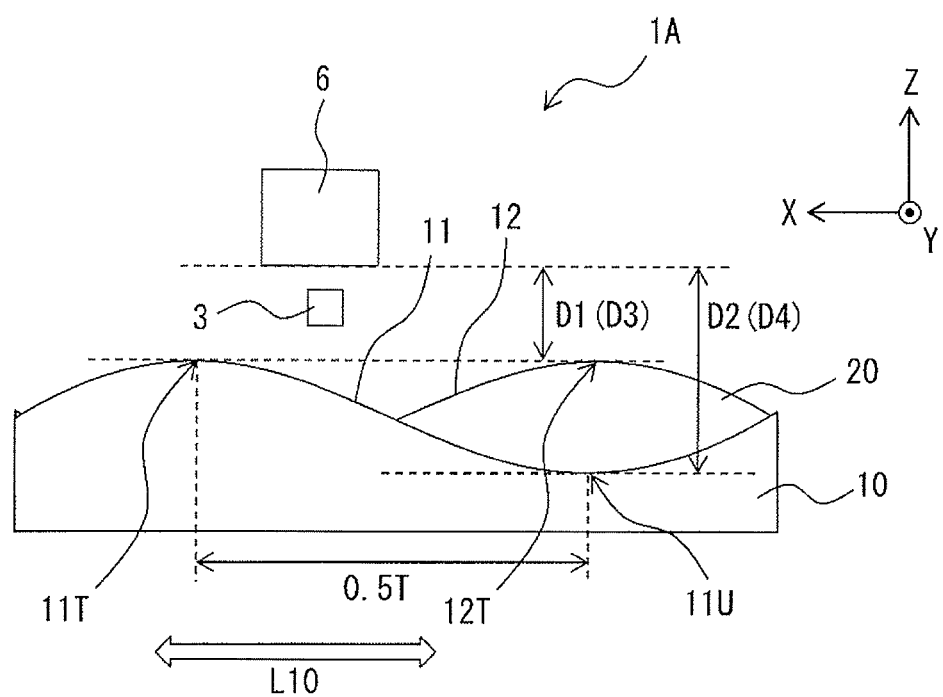
FIG. 9B is a schematic front view of a portion of the position detection system illustrated in FIG. 9A.

An example configuration of a position detection system 1A according to a second embodiment of the disclosure will now be described with reference to FIGS. 9A and 9B. The position detection system 1 according to the first embodiment described above may include the single magnet 6 with respect to the single magnetic yoke 10 and the single sensor 3. In contrast, the position detection system 1A according to the second embodiment may include two magnetic yokes 10 and 20 with respect to the single sensor 3 and the single magnet 6, as illustrated in FIGS. 9A and 9B. The position detection system 1A may thus cause the magnet 6 to generate a magnetic field and may detect positions, in the X-axis direction, of the magnetic yokes 10 and 20 that rectilinearly move in synchronization with each other. Except this difference, the position detection system 1A according to the second embodiment may have substantially the same configuration as the position detection system 1 according to the first embodiment. FIG. 9A is a perspective view of the magnetic yokes 10 and 20 and the magnet 6 in the position detection system 1A. FIG. 9B is a front view of the magnetic yokes 10 and 20, the sensor 3, and the magnet 6 in the position detection system 1A. Note that the position detection system 1A may correspond to a specific but non-limiting example of the position detection system according to one embodiment of the disclosure. The magnetic yoke 20 may correspond to a specific but non-limiting example of a second soft ferromagnetic member according to one embodiment of the disclosure.

With reference to FIGS. 9A and 9B, the magnetic yoke 10 and the magnetic yoke 20 may be opposed to each other in the Y-axis direction in the position detection system 1A. The magnetic yoke 20 may a plate member extending along the X-axis direction so as to be parallel to the magnetic yoke 10 and having a thickness in the Y-axis direction. The magnetic yoke 20 is rectilinearly movable in synchronization with the magnetic yoke 10 in the +X direction and −X direction with respect to the detection module including the magnet 6. The magnetic yokes 10 and 20 may be fixed to a common moving object.

The magnetic yoke 20 has an outer edge 12 opposed to the sensor 3 and the magnet 6 in the detection module 2 in the Z-axis direction. The outer edge 12 is remote from the magnet 6 by a distance 12D, for example, in the Z-axis direction, as illustrated in FIG. 9A. Like the outer edge 11 of the magnetic yoke 10, the outer edge 12 has a non-flat or uneven shape with a protrusion 12T and a depression 12U, for example. For example, the outer edge 12 may have a shape defining a distance with respect to the magnet 6 in the Z-axis direction, and the distance changes cyclically in the X-axis direction to define a sine curve, for example. In other words, the outer edge 12 may have a continuous curved face. The protrusion 12T is remote from the magnet 6 by a third distance D3 in the Z-axis direction. The protrusion 12T may correspond to a specific but non-limiting example of a third outer edge part according to one embodiment of the disclosure. The depression 12U is remote from the magnet 6 by a fourth distance D4 in the Z-axis direction. The depression 12U may correspond to a specific but non-limiting example of a fourth outer edge part according to one embodiment of the disclosure. The protrusion 12T and the depression 12U are disposed at different positions in the X-axis direction. In the second embodiment, the third distance D3 may be a minimum value of the distance 12D, and the fourth distance D4 may be a maximum value of the distance 12D. In the position detection system 1A according to the second embodiment of the disclosure, the first distance D1 may be equal to the third distance D3, and the second distance D2 may be equal to the fourth distance D4. Additionally, the length from the protrusion 12T to the depression 12U in the X-axis direction may correspond to 0.5T, which corresponds to a half-cycle length of the sine curve defined by the outer edge 12. In the position detection system 1A according to the second embodiment, one cycle (1T) of the sine curve defined by the outer edge 11 and one cycle (1T) of the sine curve defined by the outer edge 12 may be equal to each other. However, as illustrated in FIG. 9B, the phase of the curve defined by the outer edge 11 may be different by 0.5 cycle (0.5T) from the phase of the curve defined by the outer edge 12.

Like the magnetic yoke 10, the magnetic yoke 20 may mainly, but not limited necessarily to mainly, include a soft ferromagnetic material, such as Permalloy.

Moving the magnetic yoke 10 together with the magnetic yoke 20 along the X-axis may cause a cyclic change of the magnetic line 6L (described below) of the magnetic field imparted from the magnet 6 to the sensor 3. The magnet 6 may be disposed between the magnetic yoke 10 and the magnetic yoke 20 in the Y-axis direction as illustrated in FIGS. 10 to 12 described below, for example.

The change of the magnetic line 6L during the operation of the position detection system 1A illustrated in FIG. 9A, for example, will now be described with reference to FIGS. 10 to 13.

Figure 10A:
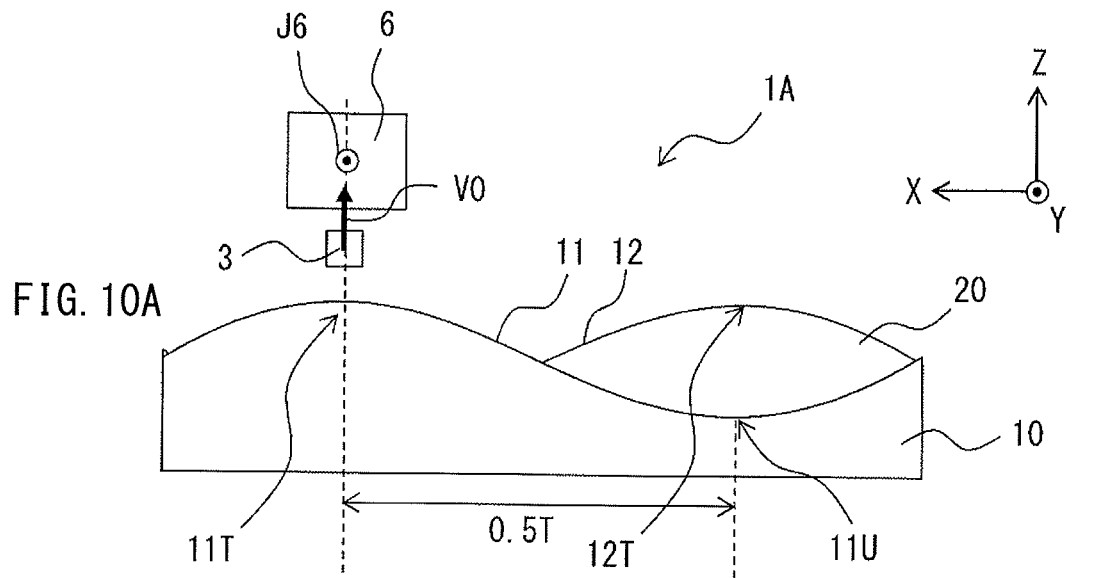
FIG. 10A is a first explanatory diagrams each schematically illustrating a change of a magnetic line during the operation of the position detection system illustrated in FIGS. 9A and 9B.
Figure 10B:
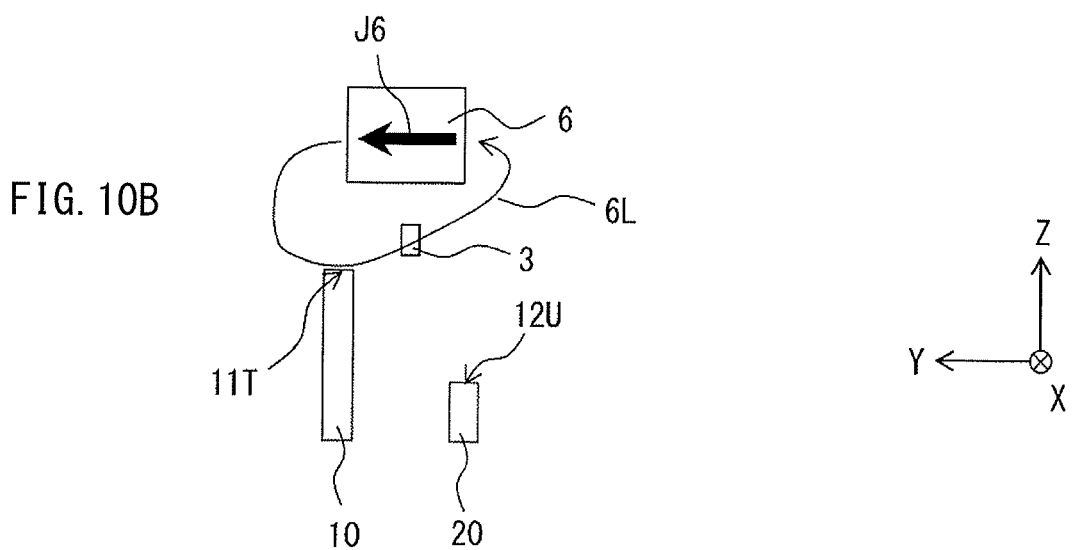
FIG. 10B is a first explanatory diagrams each schematically illustrating a change of a magnetic line during the operation of the position detection system illustrated in FIGS. 9A and 9B.

FIGS. 10A and 10B illustrate a first condition of the position detection system 1A in which the protrusion 11T of the magnetic yoke 10 and the depression 12U of the magnetic yoke 20 reach the center position CP3 of the sensor 3 in the X-axis direction. The positions of the magnetic yokes 10 and 20 in the first condition illustrated in FIGS. 10A and 10B may correspond to a reference position 0T.

FIGS. 11A and 11B illustrate a second condition of the position detection system 1A in which a middle point between the protrusion 11T and the depression 11U or a middle point between the protrusion 12T and the depression 12U in the X-axis direction reaches the center position CP3 of the sensor 3. The displacement ΔX of the magnetic yokes 10 and 20 in the second condition illustrated in FIGS. 11A and 11B may correspond to 0.25T (quarter cycle).

Figure 12A:
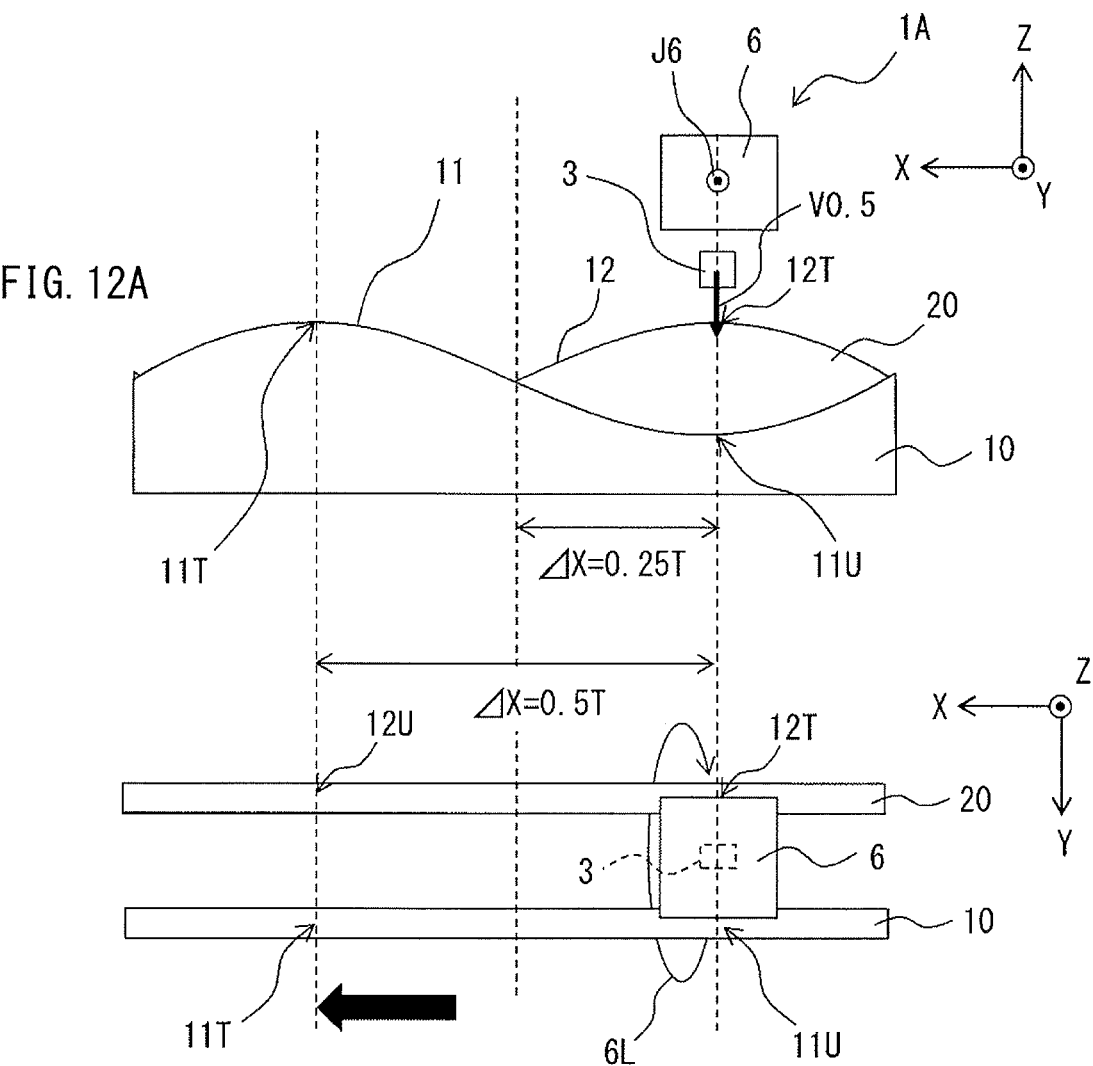
FIG. 12A is a third explanatory diagrams each schematically illustrating a change of the magnetic line during the operation of the position detection system illustrated in FIGS. 9A and 9B.
Figure 12B:
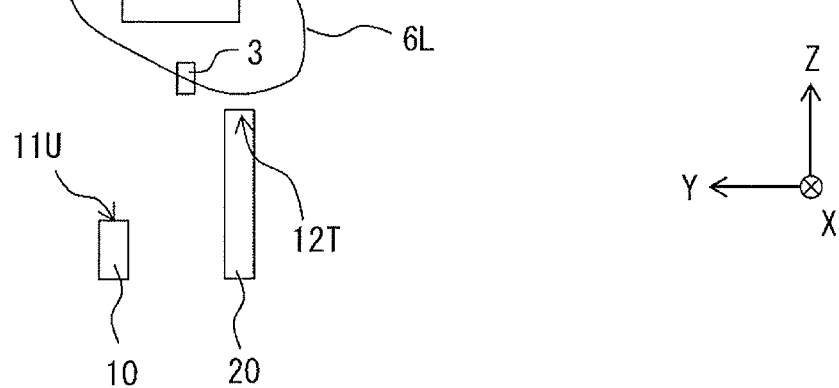
FIG. 12B is a third explanatory diagrams each schematically illustrating a change of the magnetic line during the operation of the position detection system illustrated in FIGS. 9A and 9B.

FIGS. 12A and 12B illustrate a third condition of the position detection system 1A in which the depression 11U of the magnetic yoke 10 and the protrusion 12T of the magnetic yoke 20 reach the center position CP3 of the sensor 3 in the X-axis direction. The displacement ΔX of the magnetic yokes 10 and 20 in the third condition illustrated in FIGS. 12A and 12B may correspond to 0.5T (half cycle).

FIG. 10A illustrates a front view and a top view of the magnetic yokes 10 and 20, the sensor 3, and the magnet 6 in the position detection system 1A in the first condition. FIG. 10B illustrates a perspective view of the magnetic yokes 10 and 20, the sensor 3, and the magnet 6 in the position detection system 1A in the first condition.

FIG. 11A illustrates a front view and a top view of the magnetic yokes 10 and 20, the sensor 3, and the magnet 6 in the position detection system 1A in the second condition. FIG. 11B illustrates a perspective view of the magnetic yokes 10 and 20, the sensor 3, and the magnet 6 in the position detection system 1A in the second condition.

FIG. 12A illustrates a front view and a top view of the magnetic yokes 10 and 20, the sensor 3, and the magnet 6 in the position detection system 1A in the third condition. FIG. 12B illustrates a perspective view of the magnetic yokes 10 and 20, the sensor 3, and the magnet 6 in the position detection system 1A in the third condition.

Figure 13A:
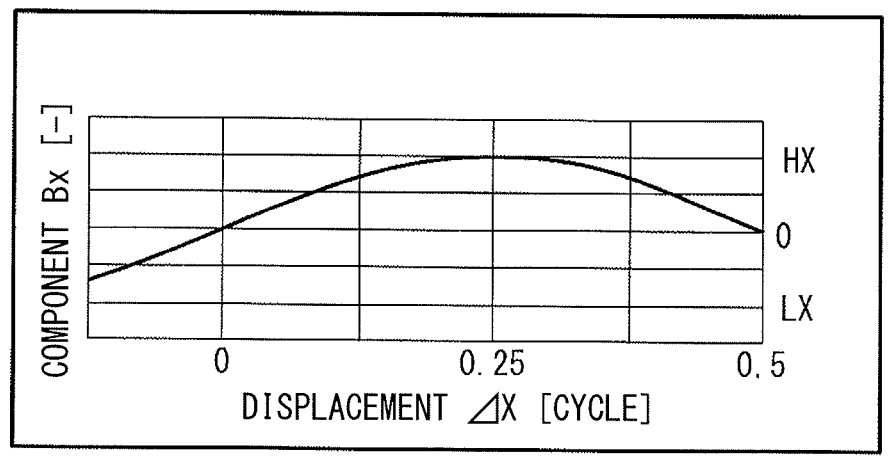
FIG. 13A is a characteristic diagrams each illustrating an example relation between the displacement of a magnetic yoke and an output from the sensor of the position detection system illustrated in FIGS. 9A and 9B.
Figure 13B:
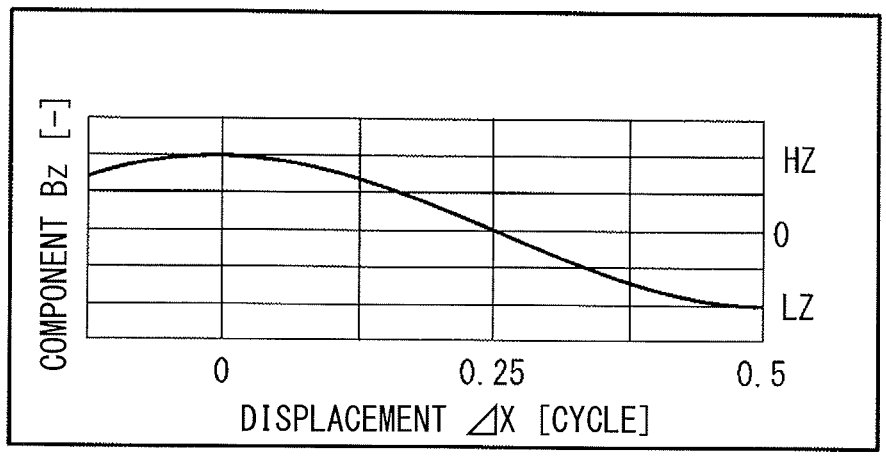
FIG. 13B is a characteristic diagrams each illustrating an example relation between the displacement of a magnetic yoke and an output from the sensor of the position detection system illustrated in FIGS. 9A and 9B.

FIG. 13A illustrates an example relation between the component Bx of the magnetic line 6L detected by the sensor 3 and the displacement ΔX of the magnetic yokes 10 and 20 in the X-axis direction. FIG. 13B illustrates an example relation between the component Bz of the magnetic line 6L detected by the sensor 3 and the displacement ΔX of the magnetic yokes 10 and 20 in the X-axis direction.

In the first condition illustrated in FIGS. 10A and 10B, the vector V0 of the magnetic line 6L passing through the sensor 3 does not include the component Bx in the X-axis direction and may include only the component By in the Y-axis direction and the component Bz in the Z-axis direction. Note that, the component Bz of the vector V0 may be directed in the +Z direction in the first condition. The component Bx may thus become 0 (zero) at the reference position where the displacement ΔX is 0T as illustrated in FIG. 13A, while the component Bz may become a maximum value HZ at the reference position where the displacement ΔX is 0T, as illustrated in FIG. 13B.

In the second condition illustrated in FIGS. 11A and 11B in which the positions of the magnetic yokes 10 and 20 are shifted by 0.25T in the +X direction from the positions in the first condition, the vector V0.25 of the magnetic line 6L passing through the sensor 3 does not include the component Bz in the Z-axis direction and may include only the component Bx in the X-axis direction and the component By in the Y-axis direction. Note that, the component Bx of the vector V0.25 may be directed in the +X direction in the second condition. The component Bx may thus become a maximum value HX at the position where the displacement ΔX is 0.25T, as illustrated in FIG. 13A, while the component Bz may become 0 (zero) at the position where the displacement ΔX is 0.25T, as illustrated in FIG. 13B.

In the third condition illustrated in FIGS. 12A and 12B in which the positions of the magnetic yokes 10 and 20 are shifted by 0.5T in the +X direction from the positions in the first condition, the vector V0.5 of the magnetic line 6L passing through the sensor 3 does not include the component Bx in the X-axis direction and may include only the component By in the Y-axis direction and the component Bz in the Z-axis direction, as in the first condition illustrated in FIGS. 10A and 10B. Note that, although the component Bz of the vector V0 may be directed in the +Z direction in the first condition illustrated in FIGS. 10A and 10B, the component Bz of the vector V0.5 may be directed in the −Z direction in the third condition illustrated in FIGS. 12A and 12B. The component Bx may thus become 0 (zero) at the position where the displacement ΔX is 0.5T, as illustrated in FIG. 13A, while the component Bz may become a minimum value LZ at the position where the displacement ΔX is 0.5T, as illustrated in FIG. 13B.

As described above, like the position detection system 1 according to the first embodiment, the position detection system 1A according to the second embodiment makes it possible to determine the displacement ΔX of the magnetic yokes 10 and 20 along the X-axis direction on the basis of the first signal S1 indicative of the change of the component Bx and the second signal S2 indicative of the change of the component Bz. Accordingly, the position detection system 1A according to the second embodiment is expected to provide similar effects to those of the position detection system 1 according to the first embodiment described above.

Furthermore, the position detection system 1A according to the second embodiment may include the two magnetic yokes 10 and 20 that are adjacent to each other in the Y-axis direction orthogonal to the X-axis direction along which the magnetic yokes 10 and 20 moves. The position detection system 1A according to the second embodiment of the disclosure, therefore, is less likely to decrease in detection accuracy due to the positional shifts of the sensor 3 and the magnet 6 in the Y-axis direction, compared with the position detection system 1 according to the first embodiment. One reason for this is that the configuration of the position detection system 1A according to the second embodiment doubles the amplitude of the component Bx along the X-axis direction in which the magnetic yokes 10 and 20 moves and the amplitude of the component Bz along the Z-axis direction in the magnetic field generated from the magnet 6, compared with the configuration of the position detection system 1 including the single magnetic yoke, which results in an improvement in the S/N ratio.

Furthermore, the position detection system 1A according to the second embodiment may include the sensor 3 disposed between the magnetic yoke 10 and the magnetic yoke 20. When the sensor 3 is shifted remote from the magnetic yoke 10 along the Y-axis direction, for example, the sensor 3 may inevitably move closer to the magnetic yoke 20 along the Y-axis direction. Accordingly, even when the sensor 3 moves farther away from the magnetic yoke 10 and the magnetic flux density of the magnetic field covering the position of the sensor 3 is thus reduced, the magnetic yoke 20 may move closer to the sensor 3 and complement the magnetic flux density of the magnetic field covering the position of the sensor 3. It therefore is possible for the position detection system 1A according to the second embodiment of the disclosure to prevent a decrease in the detection sensitivity due to the influence of the positional shifts of the sensor 3 and the magnetic yokes 10 and 20 in the Y-axis direction.

3. Third Embodiment

An example configuration of a position detection system 1B according to a third embodiment of the disclosure will now be described with reference to FIG. 14A to FIG. 14C. The position detection system 1A according to the second embodiment described above may include the single magnet 6 with respect to the two magnetic yokes 10 and 20 and the single sensor 3. In contrast, the position detection system 1B according to the third embodiment may include the two magnetic yokes 10 and 20 and two magnets 6A and 6B with respect to the single sensor 3, as illustrated in FIGS. 14A and 14B. The position detection system 1B may thus cause the magnets 6A and 6B to generate magnetic fields and may detect positions, in the X-axis direction, of the magnetic yokes 10 and 20 that rectilinearly move in synchronization with each other. Except this difference, the position detection system 1B according to the third embodiment may have substantially the same configuration as the position detection system 1A according to the second embodiment. FIG. 14A is a perspective view of the magnetic yokes 10 and 20 and the magnets 6A and 6B in the position detection system 1B. FIG. 14B is a front view of the magnetic yokes 10 and 20, the sensor 3, and the magnets 6A and 6B in the position detection system 1B. FIG. 14C is a perspective view of the sensor 3 and the magnets 6A and 6B in the position detection system 1B. Note that the position detection system 1B may correspond to a specific but non-limiting example of the position detection system according to one embodiment of the disclosure. The magnet 6A may correspond to a specific but non-limiting example of the first magnet according to one embodiment of the disclosure. The magnet 6B may correspond to a specific but non-limiting example of a second magnet according to one embodiment of the disclosure.

With reference to FIGS. 14A and 14B, the magnets 6A and 6B may be disposed adjacent to each other with an interval therebetween along the X-axis direction in which the magnetic yokes 10 and 20 moves, in the position detection system 1B. The sensor 3 may be disposed between the magnet 6A and the magnet 6B in the X-axis direction, and between the magnets 6A and 6B and the magnetic yokes 10 and 20 in the Z-axis direction in which the magnets 6A and 6B and the magnetic yokes 10 and 20 are opposed to each other. With reference to FIG. 14C, the magnets 6A and 6B may each be magnetized along the Y-axis direction. The magnet 6A may generate a magnetic field including a magnetic line 6AL, and the magnet 6B may generate a magnetic field including a magnetic lines 6BL. The magnetic lines 6AL and 6BL passing through the sensor 3 may each have a vector directed in the direction along the Y-axis. The vectors of the magnetic lines 6AL and 6BL passing through the sensor 3 may be substantially parallel to each other.

For example, the magnets 6A and 6B may be disposed between the magnetic yoke 10 and the magnetic yoke 20 in the Y-axis direction.

Accordingly, the position detection system 1B according to the third embodiment is expected to provide similar effects to those of the position detection system 1 according to the first embodiment described above and the position detection system 1A according to the second embodiment described above. Furthermore, in the position detection system 1B according to the third embodiment, the magnetic lines 6AL and 6BL may be generated by the respective magnets 6A and 6B that are adjacent to each other, and the magnetic lines 6AL and 6BL passing through the sensor 3 may each have a vector directed in the direction along the Y-axis. This generates an unstable region at or near the sensor 3 where the magnetic line 6AL and the magnetic line 6BL repel each other. For example, when the protrusion 11T of the magnetic yoke 10 passes by the vicinity of the unstable region, the vectors of the magnetic lines 6AL and 6BL change in direction with high sensitivity. The position detection system 1B according to the third embodiment, therefore, allows the sensor 3 to detect a larger output change than the position detection system 1 according to the first embodiment and the position detection system 1A according to the second embodiment do.

4. Modification Examples of First to Third Embodiments

Although the first to third embodiments of the disclosure are described above, the disclosure should not be limited to these embodiments and various modification may be made. For example, although the first and second soft ferromagnetic members may each have such an unevenly curved shape that the outer edge thereof defines a sine curve in the foregoing embodiments, the disclosure should not be limited to these embodiments. In one modification example of the disclosure, the outer edge may be rectangular, for example.

Although the two magnetic yokes and the two magnets may be provided with respect to the single sensor in the third embodiment described above, a single magnetic yoke and two magnets may be provided with respect to a single sensor in one modification example of the disclosure, for example.

Figure 15:
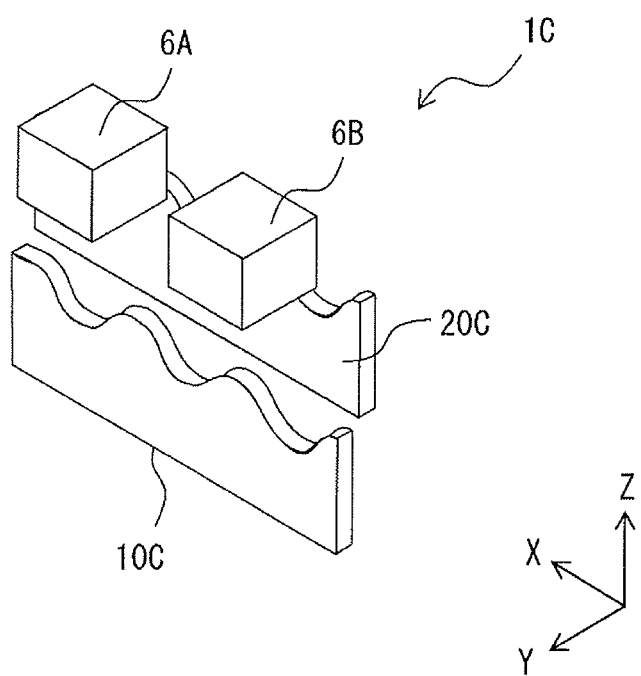
FIG. 15 is a schematic perspective view of a portion of a position detection system having an example configuration according to one modification example.

Although the magnetic yoke may have the outer edge with the single protrusion and the single depression in the drawings relevant to the first to third embodiments described above, the disclosure should not be limited to these embodiments. For example, in the position detection system 1C according to one modification example of the first to third embodiments, magnetic yokes 10C and 20C may have respective outer edges 11 and 12 with multiple protrusions and multiple depressions alternately and repeatedly provided in the X-axis direction, as illustrated in FIG. 15.

Additionally, the movable length of the magnetic yoke in the X-axis direction may be longer than one cycle length of the outer edge in the X-axis direction.

Although the magnetic detector may include the two magnetism detection devices in at least one of the embodiments and modification examples described above, the number of the magnetism detection devices should not be limited to two. In another embodiment of the disclosure, only one magnetism detection device may be provided, or three or more magnetism detection devices may be provided. Note that, in the embodiment where three or more magnetism detection devices are provided, the magnetism detection devices magnetic sensors may output signals having different phases.

Although the magnetic sensors 31 and 32 each having a magneto-resistive effect element are described as an example of the magnetism detection devices in the first embodiment described above, the disclosure should not be limited to the first embodiment. The magnetism detection device may be any device that detect a change in direction or angle of a magnetic field. For example, the magnetism detection device may be a Hall effect device, in one modification example of the disclosure.

Additionally, in one modification example of the disclosure, the magnetic detector may include one or more biaxial magnetism detection devices each including a first detection axis and a second detection axis orthogonal to each other. Alternatively, in another modification example of the disclosure, the magnetic detector may have multiple pairs each including two adjacent magnetism detection devices, i.e., a first magnetism detection device having a first detection axis and a second magnetism detection device having a second detection axis orthogonal to the first detection axis. In a case where the biaxial magnetism detection devices are disposed at different positions or where the pairs of the magnetism detection devices are disposed at different positions, the biaxial magnetism detection devices or the pairs of the magnetism detection devices may be disposed at an arrangement pitch identical to the arrangement pitch of the protrusions of the soft ferromagnetic member in the movable direction of the soft ferromagnetic member, for example.

5. Fourth Embodiment

[Configuration of Rotation Detection System]

Figure 17:
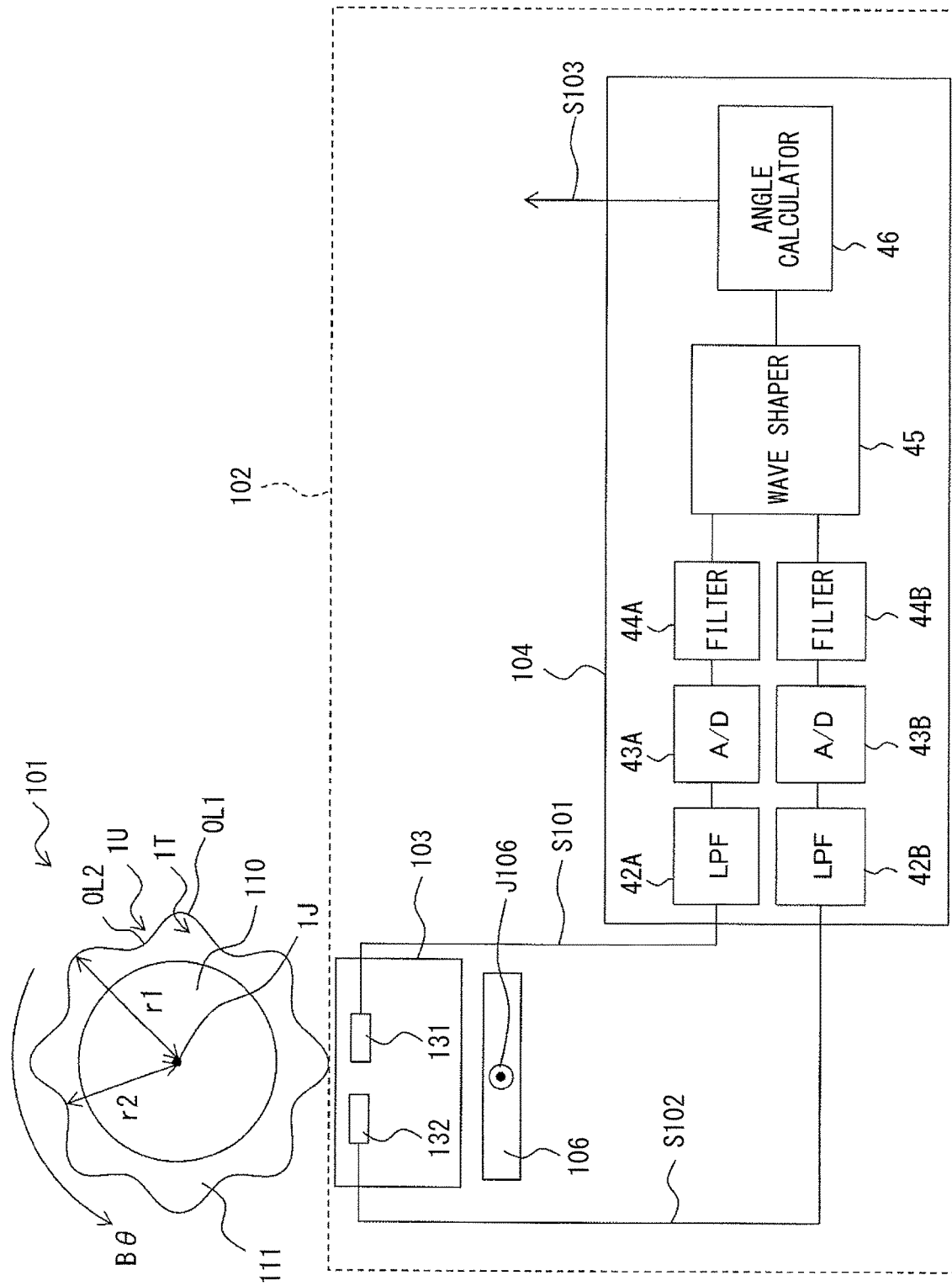
FIG. 17 is a diagram schematically illustrating an example overall configuration of a rotation detection system according to one embodiment of the disclosure.
Figure 18:
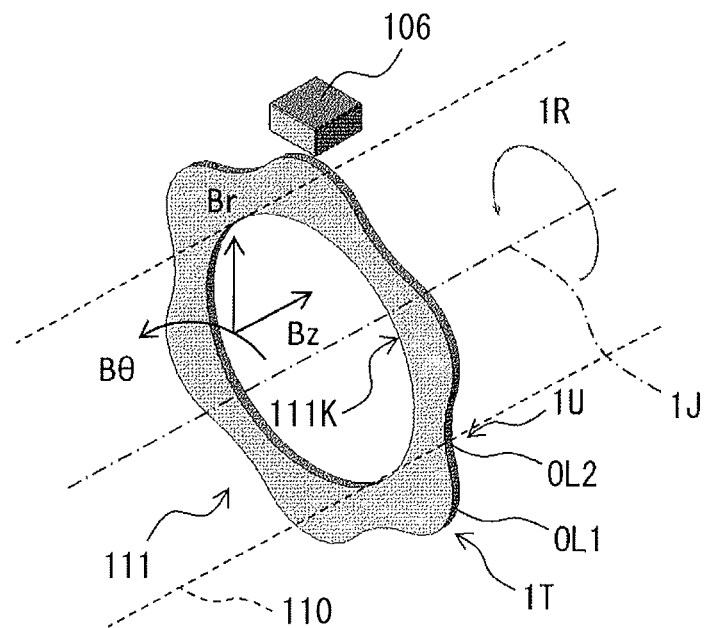
FIG. 18 is a schematic perspective view of a portion of the rotation detection system illustrated in FIG. 17.
Figure 19:
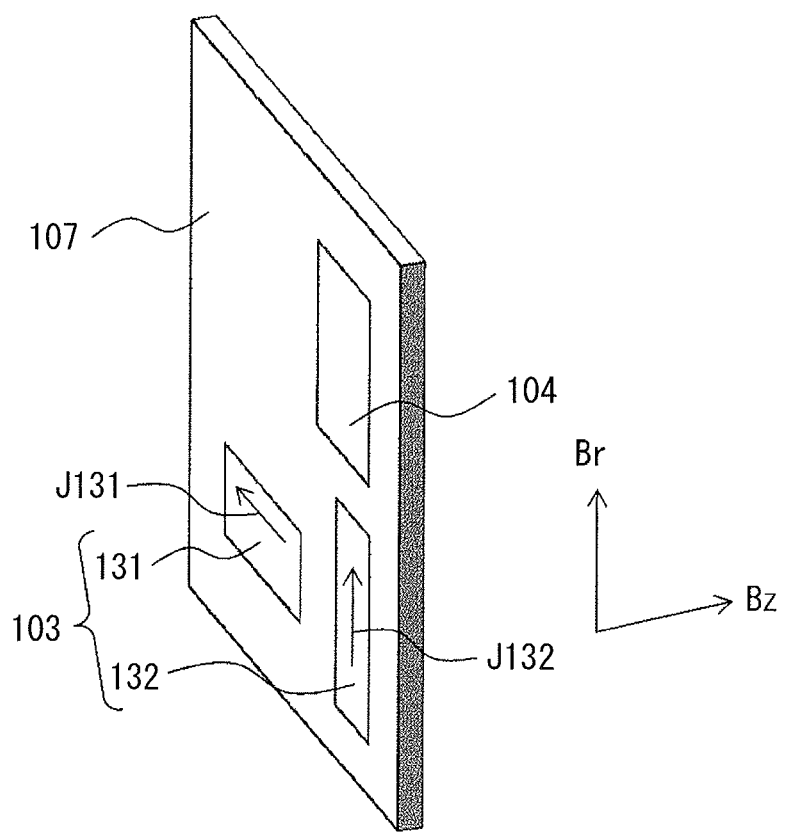
FIG. 19 is a schematic perspective view of a portion of a detection module illustrated in FIG. 17.

An example configuration of a rotation detection system according to a fourth embodiment of the disclosure will now be described with reference to FIGS. 17 to 19. FIG. 17 is a block diagram schematically illustrating an example overall configuration of the rotation detection system. FIG. 18 is a perspective view of main components of the rotation detection system. In FIG. 18, only a rotary yoke 111 and a magnet 106 that are described below are illustrated.

Referring to FIG. 17, the rotation detection system may include a rotary module 101 and a detection module 102. The rotary module 101 may serve as an object to be measured. The detection module 102 may detect a rotation angle of the rotary module 101. Note that the rotation detection system may correspond to a specific but non-limiting example of the "position detection system" according to one embodiment of the disclosure.

[Rotary Module 101]

Referring to FIGS. 17 and 18, the rotary module 101 may include a shaft 110 and a rotary yoke 111 having an annular shape and surrounding the shaft 110, for example. The rotary yoke 111 may include a soft ferromagnetic material, such as Permalloy, for example. The rotary yoke 111 may be fitted directly or indirectly to the shaft 110 that extends through an opening 111K of the rotary yoke 111. The rotary yoke 111 may be rotatable together with the shaft 110 in a rotation direction B$\theta$ around a rotary axis 1J with respect to the detection module 102. The periphery of the rotary yoke 111 may be provided with protrusions 1T and depressions 1U that are alternately and cyclically provided at predetermined intervals along the rotation direction B$\theta$. While the rotary module 101 is rotating, one of the protrusions 1T may move closest to a sensor 103 (described below) of the detection module 102 and then one of the depressions 1U may move closest to the sensor 103, which may be alternately repeated. When rotating, the rotary module 101 may thus cause a periodic change of a magnetic line 106L of a magnetic field (described below) imparted from the magnet 106 to the sensor 103. Each of the protrusions 1T may have an outer edge part OL1 remote from the rotary axis 1J by a distance r1. Each of the depressions 1U may have an outer edge part OL2 remote from the rotary axis 1J by a distance r2. The number of the protrusions 1T or the number of the depression 1U of the rotary yoke 111 may correspond to the number of teeth of the rotary yoke 111. The rotary yoke 111 may correspond to a specific but non-limiting example of a "first soft ferromagnetic rotary member" according to one embodiment of the disclosure.

[Detection Module 102]

The detection module 102 may include the sensor 103, an operation circuit 104, and the magnet 106. In this non-limiting embodiment, the sensor 103 and the operation circuit 104 in the detection module 102 may be disposed on a single substrate 107, as illustrated in FIG. 19. Alternatively, the sensor 103 and the operation circuit 104 may be respectively disposed on different substrates. FIG. 19 is a schematic perspective view of a portion of the detection module 102 illustrated in FIG. 17.

[Sensor 103]

As illustrated in FIG. 17, the sensor 103 may include magnetic sensors 131 and 132. The magnetic sensor 131 may detect a change of the magnetic line 106L of the magnetic field in association with a rotation of the rotary yoke 111 and output a first signal S101 to the operation circuit 104. Likewise, the magnetic sensor 132 may detect a change of the magnetic line 106L of the magnetic field in association with the rotation of the rotary yoke 111 and output a second signal S102 to the operation circuit 104. Referring to FIG. 19, the magnetic sensor 131 may have a detection axis J131, and the magnetic sensor 132 may have a detection axis J132 substantially orthogonal to the detection axis J131. The first signal S101 and the second signal S102 may thus have phases different from each other. For example, when the rotary yoke 111 rotates by an angle of θ and when the first signal S101 is indicative of a change in resistance depending on the value of sin θ, the second signal S102 may be indicative of a change in resistance depending on the value of cos θ.

Figure 20:
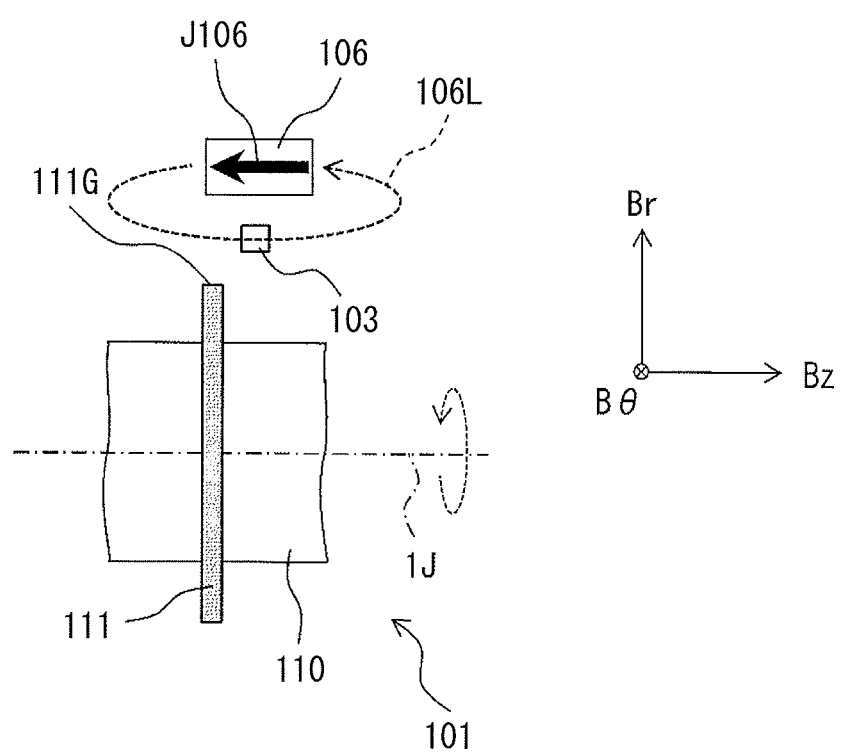
FIG. 20 is a schematic front view of a portion of the rotation detection system illustrated in FIG. 17.

FIG. 20 is a schematic front view of a portion of the detection module 102. As illustrated in FIG. 20, the sensor 103 may be disposed between an outer edge 111G of the rotary yoke 111 and the magnet 106 in a radial direction Br orthogonal to a rotary-axis direction Bz. The sensor 103 may thus be positioned so as not to overlap the rotary yoke 111 in the rotary-axis direction Bz. The rotary-axis direction Bz may be a direction in which the rotary axis 1J extends.

Figure 21:
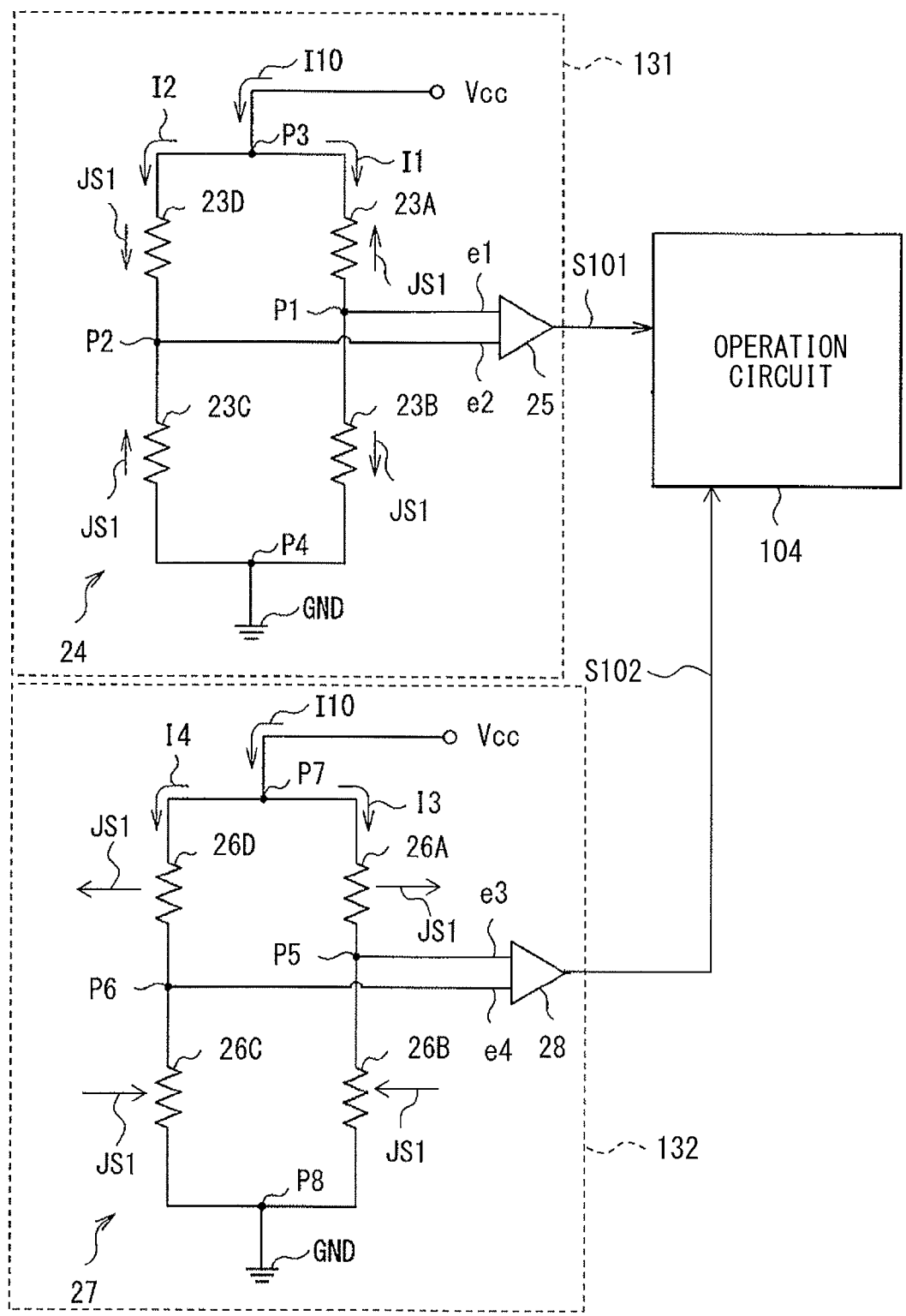
FIG. 21 is a circuit diagram of the magnetic sensor illustrated in FIG. 19.

FIG. 21 is a circuit diagram of the sensor 103. As illustrated in FIG. 21, the magnetic sensor 131 may include a Wheatstone bridge circuit (hereinafter simply referred to as a bridge circuit) 24 and a differential detector 25. The bridge circuit 24 may include four magneto-resistive effect (MR) elements 23 (23A to 23D), for example. Likewise, the magnetic sensor 132 may include a bridge circuit 27 and a differential detector 28. The bridge circuit 27 may include four MR elements 26 (26A to 26D), for example. Note that the sensor 103 may have a configuration substantially the same as the sensor 3 according to the first embodiment illustrated in FIG. 6. Thus, the configuration of the sensor 103 that is the same as the configuration of the sensor 3 is not described in detail in the following description.

In the bridge circuit 24 of the magnetic sensor 131, a current I10 from the power Vcc may be divided into a current I1 and a current I2 at a node P3, and the current I1 or the current I2 may be supplied to each of the MR elements 23A to 23D. Signals e1 and e2 extracted from the respective nodes P1 and P2 of the bridge circuit 24 may flow in the differential detector 25. For example, when the magnetization JS1 and the magnetization JS3 define an angle of γ, the signal e1 may be indicative of a change in resistance in accordance with the expression, $A \cos(+\gamma)+B$, and the signal e2 may be indicative of a change in resistance in accordance with the expression, $A \cos(-\gamma)+B$, where A and B are constants. Meanwhile, in the bridge circuit 27 of the magnetic sensor 132, a current I10 from the power Vcc may be divided into a current I3 and a current I4 at a node P7, and the current I3 or the current I4 may be supplied to each of the MR elements 26A to 26D. Signals e3 and e4 extracted from the respective nodes P5 and P6 of the bridge circuit 27 may flow in the differential detector 28. The signal e3 may be indicative of a change in resistance in accordance with the expression, $A \sin(+\gamma)+B$, and the signal e4 may be indicative of a change in resistance in accordance with the expression, $A \sin(-\gamma)+B$. Additionally, the first signal S101 from the differential detector 25 and the second signal S102 from the differential detector 28 may flow in the operation circuit 104.

The operation circuit 104 may calculate a resistance based on tan γ, where "γ" corresponds to the rotation angle θ of the rotary module 101 with respect to the sensor 103. The rotation angle θ may thus be determined in the operation circuit 104.

[Operation Circuit 104]

As illustrated in FIG. 17, the operation circuit 104 may include low-pass filters 42A and 42B, A/D converters 43A and 43B, filters 44A and 44B, a waveform shaper 45, and an angle calculator 46, for example. The operation circuit 104 may be different from the operation circuit 4 according to the first embodiment illustrated in FIG. 1 in that the operation circuit 104 does not include the position calculator 47. Except this difference, the operation circuit 104 may have a configuration substantially the same as the configuration of the operation circuit 4 according to the first embodiment. Thus, the configuration of the operation circuit 104 that is the same as the configuration of the operation circuit 4 is not described in detail in the following description.

The low-pass filter 42A may be coupled to the magnetic sensor 131 so as to receive the first signal S101 from the magnetic sensor 131. The first signal S101 received at the low-pass filter 42A may be transmitted to the waveform shaper 45 via the A/D converter 43A and the filter 44A. Likewise, the low-pass filter 42B may be coupled to the magnetic sensor 132 so as to receive the second signal S102 from the magnetic sensor 32. The second signal S102 received at the low-pass filter 42B may be transmitted to the waveform shaper 45 via the A/D converter 43B and the filter 44B.

The waveform shaper 45 may shape the waveform of the first signal S101 received from the magnetic sensor 131 and the waveform of the second signal S102 received from the magnetic sensor 132, for example. The waveform shaper 45 may include a detection circuit and a compensation circuit, for example. The detection circuit may detect a difference in offset voltage, a difference in amplitude, and a difference in relative angle between the magnetic sensor 31 and the magnetic sensor 32 with respect to the rotary yoke 111. The compensation circuit may compensate these differences.

The angle calculator 46 may be an integrated circuit (IC) that calculates a rotation angle θ of the rotary yoke 111 in the rotation direction Bθ on the basis of the first signal S101 and the second signal S102. The angle calculator 46 may output a third signal S103 including data on the calculated displacement amount (i.e., rotation angle θ) to the outside.

[Magnet 106]

The magnet 106 may be opposed to the rotary yoke 111 across the sensor 103. The magnet 106 may impart the magnetic field including the magnetic line 106L to the rotary yoke 111 and the sensor 103. The sensor 103 may cause the magnetic sensors 131 and 132 to detect a change in the direction of the magnetic line 106L. As illustrated in FIG. 20, the magnetic line 106L of the magnet filed imparted from the magnet 106 to the sensor 103 may extend along the rotary axis 1J when passing through the sensor 3. The direction of the magnetic line 106L may change cyclically in accordance with a rotation of the rotary yoke 111. When the rotary yoke 111 is at rest with respect to the magnet 106 and the sensor 103, the magnetic line 106L passing through the sensor 103 may be directed in the direction along the rotary axis 1J. The direction along the rotary axis 1J should not be limited to a direction completely parallel to the rotary axis 1J or a direction defining 0° with respect to the rotary axis 1J and may be a direction defining ±30° or less with respect to the rotary axis 1J, for example. In other words, although it is desirable that the center of the amplitude of the change in the direction of the magnetic line 106L be 0° at which the magnetic line 106L is completely parallel to the rotary axis 1J, for example, the direction of the magnetic line 106L may be inclined at an angle of ±30° or less, for example, around the center of 0°. Additionally, the amplitude of the change in a direction of the magnetic line 106L may be about ±5°, for example. In the fourth embodiment, the direction of the magnetic line 106L passing through the sensor 103 may be substantially identical to the rotary-axis direction Bz when one of the depressions 1U of the rotary yoke 111 moves closest to the magnet 106. For example, the magnetization direction J106 of the magnet 106 may be substantially identical to the rotary-axis direction Bz.

[Operations and Workings of Rotation Detection System]

The rotation detection system according to the fourth embodiment makes it possible to detect the rotation angle of the rotary yoke 111 using the detection module 102 that includes the sensor 103, the operation circuit 104, and the magnet 106.

Figure 22A:
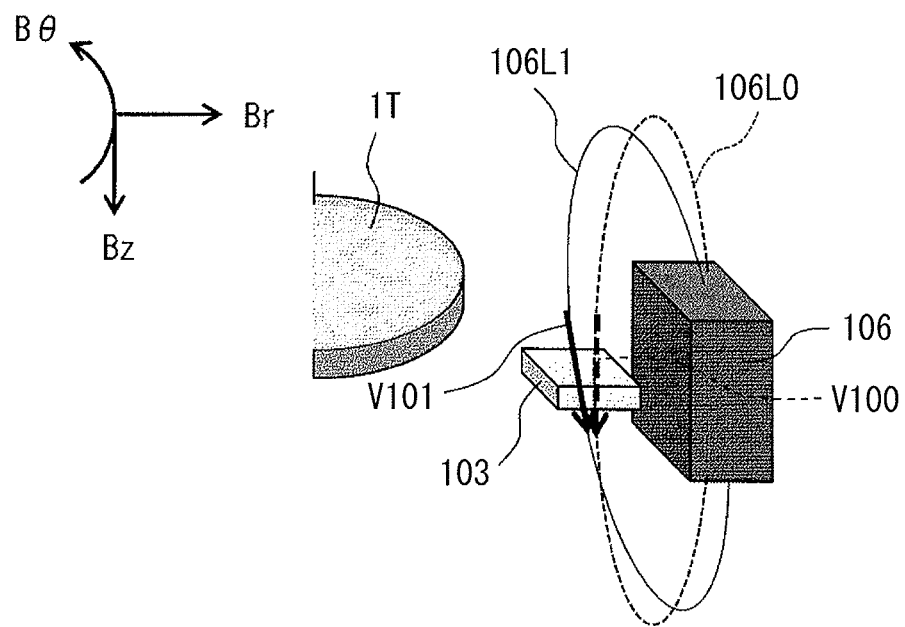
FIG. 22A is an explanatory diagram illustrating a behavior of the rotation detection system illustrated in FIG. 17.
Figure 22B:
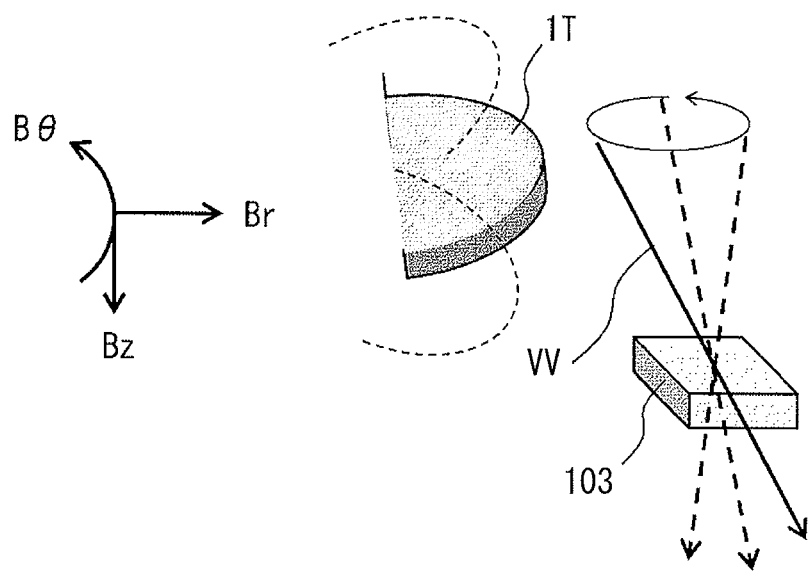
FIG. 22B is another explanatory diagram illustrating a behavior of the rotation detection system illustrated in FIG. 17.

In the rotation detection system, one of the protrusions 1T of the rotary yoke 111 may move closer to and farther away from the magnet 106 in accordance with the rotation of the rotary yoke 111 in the rotation direction Bθ. In accordance with such an operation, the vector of the magnetic line 106L generated by the magnet 106 may sequentially change. In an example condition illustrated in FIG. 22A, for example, where one of the protrusions 1T of the rotary yoke 111 is remote from the magnet 106 or where one of the depressions 1U of the rotary yoke 111 is closer to the magnet 106, a magnetic line 106L0 generated by the magnet 106 may have a vector V100 that is substantially identical to the rotary-axis direction Bz. In contrast, in an example condition where one of the protrusions 1T is closer to the magnet 106, a magnetic line 106L1 generated by the magnet 106 may have a vector V101 that is slightly inclined with respect to the rotary-axis direction Bz. Therefore, as illustrated in FIG. 22B, the vector VV of the magnetic line 106L may precess in accordance with the rotation of the rotary yoke 111 around the rotary axis 1J in the rotation direction Bθ or a sequential change in relative position of the protrusion 1T with respect to the magnet 6. Note that one of the protrusions 1T moves closer to the magnet 106 in a cycle identical to the cycle in which the vector VV of the magnetic line 106L changes. The sensor 103 may output the first signal S101 including a component Br along the radial direction Br and the second signal S102 including a component Bθ along the rotation direction Bθ. The components Br and Bθ may correspond projections on a plane parallel to the rotational plane of the rotary yoke 111 (i.e., plane orthogonal to the rotary axis 1J). The operation circuit 104 may determine a rotation angle and an angular speed of the rotary yoke 111 on the basis of the first signal S101 and the second signal S102.

[Effects of Rotation Detection System]

According to the rotation detection system of the fourth embodiment, the rotary yoke 111 may be rotatable around the rotary axis 1J with respect to the sensor 103. The rotary yoke 111 may have the outer edge parts OL1 remote from the rotary axis 1J by the distance r1 and the outer edge parts OL2 remote from the rotary axis 1J by the distance r2. This configuration allows the sensor 103 to detect a slight change in the vector VV of the magnetic line 106L of the magnet 106 in association with the rotation of the rotary yoke 111. Further, the vector VV of the magnetic line 106L passing through the sensor 103 may be directed in the direction along the rotary axis 1J. This reduces an influence of the precision in the relative positions among the rotary yoke 111, the sensor 103, and the magnet 106 on the waveform of an output signal from the sensor 103. Accordingly, the rotation detection system according to the fourth embodiment of the disclosure makes it possible to accurately detect of the rotation of the rotary yoke 111 even when downsized.

However, in a rotation detection system according to a second reference example illustrated in FIGS. 29A, 29B, and 29C, for example, a magnet 1106 generates a magnet line 1106L extending along the radial direction Br of the rotary member 1101. Unfortunately, the relative positions among the rotary member 1101, the sensor 1103, and the magnet 1106 have a significant influence on the detection accuracy of the sensor sensor 1103. For example, when the relative positions among the rotary member 1101, the sensor 1103, and the magnet 1106 are appropriate, the waveform of a first signal S1001 and the waveform of a second signal S1002 are appropriate as illustrated in FIG. 29B. However, when the relative positions among the rotary member 1101, the sensor 1103, and the magnet 1106 are slightly shifted in the radial direction Br, the waveform of the first signal S1001 can deform as illustrated in FIG. 29A, for example, or the waveform of the second signal S1002 can deform as illustrated in FIG. 29C, for example. The rotation detection system according to the second reference example is also likely to decrease in detection accuracy due to the shift of the position of the rotary member 1101 in the rotary-axis direction Bz. Note that a position detection sensor described in Japanese Patent No. 5013146 mentioned hereinabove is considered to correspond to the rotation detection system according to the second reference example illustrated in FIGS. 29A, 29B, and 29C.

In contrast, the rotation detection system according to the fourth embodiment of the disclosure, the allowable range of the relative positions among the rotary yoke 111, the sensor 103, and the magnet 106 may be larger than that in the rotation detection system according to the second reference example. The rotation detection system according to the fourth embodiment of the disclosure is thus unlikely to decrease in detection accuracy due to the shift in relative positions among the rotary yoke 111, the sensor 103, and the magnet 106. Accordingly, the rotation detection system according to the fourth embodiment of the disclosure has superior manufacturability even when downsized.

6. Fifth Embodiment

Figure 23A:
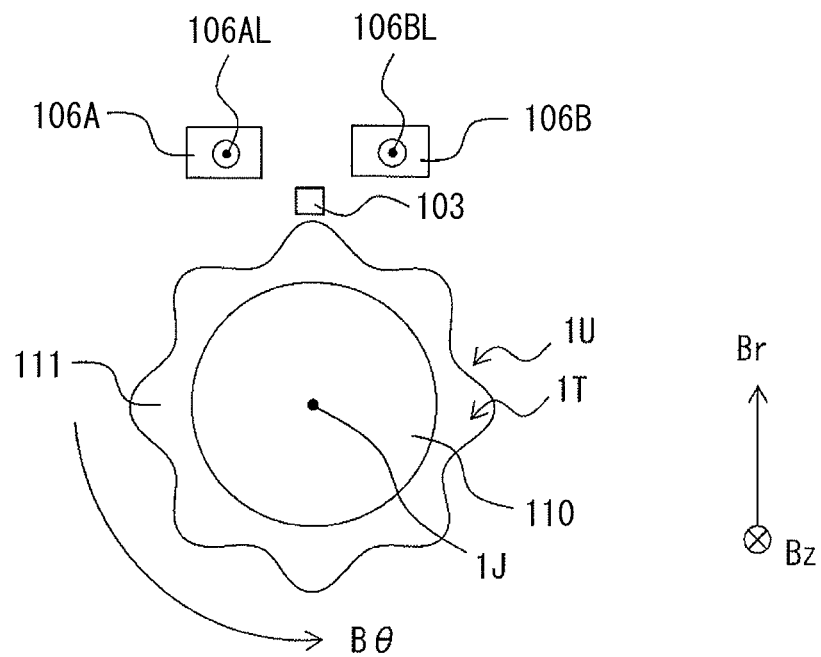
FIG. 23A is a schematic side view of a portion of a rotation detection system according to one embodiment of the disclosure.
Figure 23B:
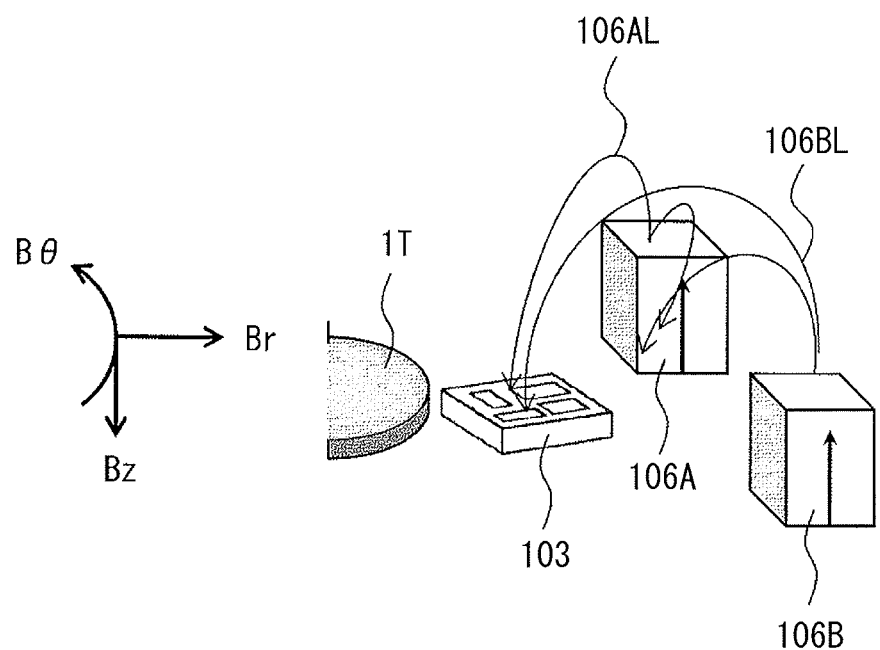
FIG. 23B is a schematic perspective view of a portion of the rotation detection system illustrated in FIG. 23A.

An example configuration of a rotation detection system according to a fifth embodiment of the disclosure will now be described with reference to FIGS. 23A and 23B. The rotation detection system according to the fourth embodiment described above may include the single magnet 106 with respect to the single rotary yoke 111 and the single sensor 103. In contrast, the rotation detection system according to the fifth embodiment may include two magnets 106A and 106B with respect to the single rotary yoke 111 and the single sensor 103, as illustrated in FIGS. 23A and 23B. Except this difference, the rotation detection system according to the fifth embodiment may have a configuration substantially the same as the configuration of the rotation detection system according to the fourth embodiment. FIG. 23A is a side view of the rotation detection system according to the fifth embodiment as seen in the rotary-axis direction Bz. FIG. 23B is a perspective view of main components of the rotation detection system according to the fifth embodiment.

With reference to FIGS. 23A and 23B, the magnet 106A and the magnet 106B may be disposed adjacent to each other with an interval therebetween along the rotation direction Bθ. The sensor 103 may be disposed between the magnet 106A and the magnet 106B in the rotation direction Bθ, and between the rotary yoke 111 and the magnets 106A and 106B in the radial direction Br. The magnets 106A and 106B may each be magnetized along the rotary-axis direction Bz. The magnet 106A may generate a magnetic field having a magnetic line 106AL, and the magnet 106B may generate a magnetic line 106BL. As illustrated in FIG. 23B, the magnetic lines 106AL and 106BL passing through the sensor 103 may each have a vector directed in the direction along the rotary axis 1J. The vectors of the magnetic lines 106AL and 106BL passing through the sensor 103 may be substantially parallel to each other.

Accordingly, the rotation detection system according to the fifth embodiment of the disclosure is expected to provide similar effects to those of the rotation detection system according to the fourth embodiment described above. Furthermore, in the rotation detection system according to the fifth embodiment, the magnetic lines 106AL and 106BL may be generated by the respective magnets 106A and 106B that are adjacent to each other, and the magnetic lines 106AL and 106BL passing through the sensor 103 may each have a vector directed in the direction along the rotary axis 1J. This generates an unstable region at or near the sensor 103 where the magnetic line 106AL and the magnetic line 106BL repel each other. For example, when one of the protrusions 1T of the rotary yoke 111 passes by the vicinity of the unstable region, the vectors of the magnetic line 106AL and 106BL change in direction with high sensitivity. The rotation detection system according to the fifth embodiment, therefore, allows the sensor 103 to detect a larger output change than the rotation detection system according to the fourth embodiment does.

7. Sixth Embodiment

Figure 24A:
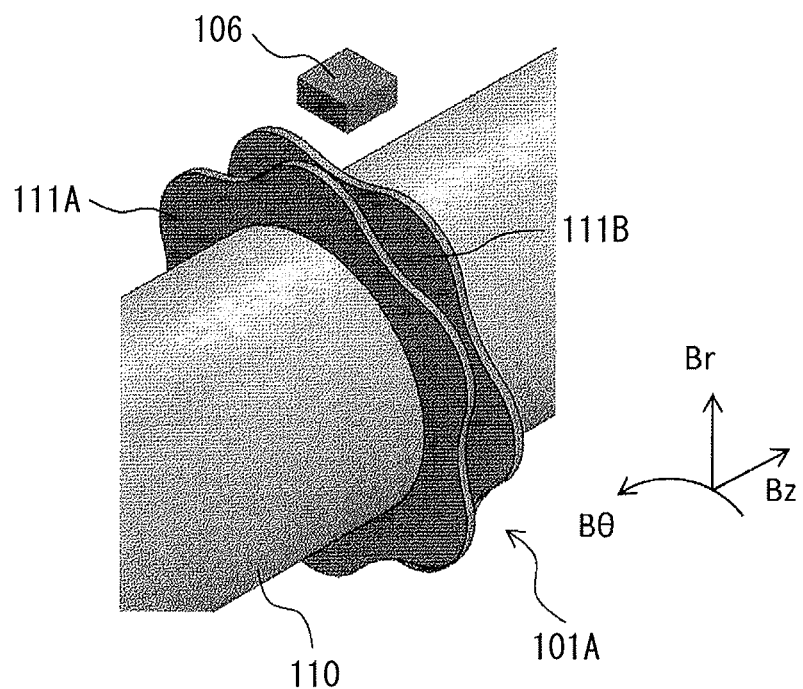
FIG. 24A is a schematic perspective view of a portion of a rotation detection system having an example configuration according to one embodiment of the disclosure.
Figure 24B:
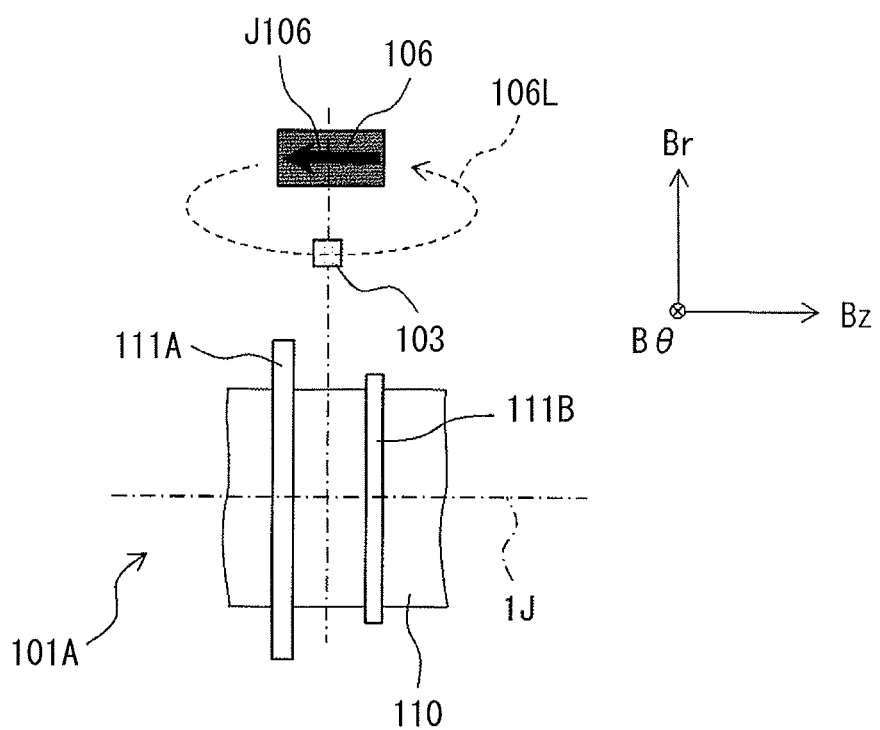
FIG. 24B is a schematic front view of a portion of the rotation detection system illustrated in FIG. 24A.
Figure 24C:
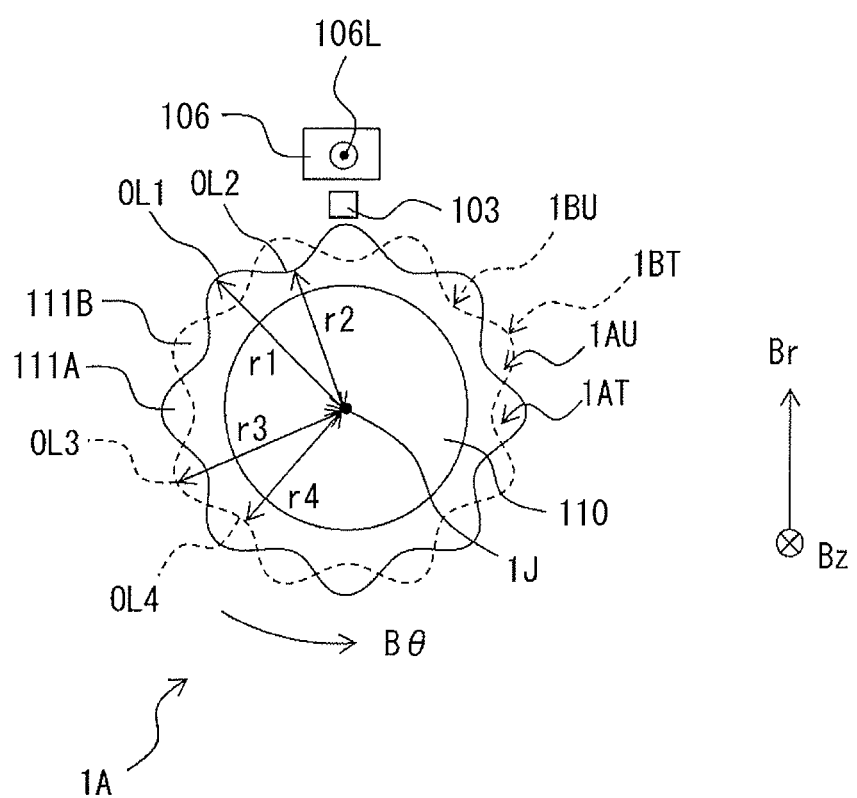
FIG. 24C is a schematic side view of a portion of the rotation detection system illustrated in FIG. 24A.

An example configuration of a rotation detection system according to a sixth embodiment of the disclosure will now be described with reference to FIGS. 24A to 24C. FIG. 24A is a schematic perspective view of a portion of the rotation detection system according to the sixth embodiment. FIG. 24B is a schematic front view of the portion of the rotation detection system illustrated in FIG. 24A. FIG. 24C is a schematic side view of the portion of the rotation detection system illustrated in FIG. 24A. The rotary module 101 of the rotation detection system according to the fourth embodiment may include the single rotary yoke 111 with respect to the single sensor 103 and the single magnet 106. In contrast, a rotary module 101A of the rotation detection system according to the sixth embodiment may include two rotary yokes 111A and 111B with respect to the single sensor 103 and the single magnet 106, as illustrated in FIGS. 24A and 24B. Except this difference, the rotation detection system according to the sixth embodiment may have a configuration substantially the same as the configuration of the rotation detection system according to the fourth embodiment. The rotary yoke 111A may correspond to a specific but non-limiting example of the first soft ferromagnetic member according to one embodiment of the disclosure. The rotary yoke 111B may correspond to a specific but non-limiting example of a second soft ferromagnetic member according to one embodiment of the disclosure.

The rotary yoke 111A and the rotary yoke 111B may be fixed to the shaft 110 so as to be adjacent to each other with an interval therebetween in the rotary-axis direction Bz. Accordingly, the rotary yokes 111A and 111B may be rotatable around a rotary axis 101J in synchronization with each other. For example, the sensor 103 may be disposed between the rotary yoke 111A and the rotary yoke 111B in the rotary-axis direction Bz, as illustrated in FIG. 24B.

The rotary yokes 111A and 111B may each have a configuration substantially the same as the configuration of the rotary yoke 111 according to the fourth embodiment described above. That is, the rotary yoke 111A may have outer edge parts OL1 remote from the rotary axis 1J by a distance r1 and outer edge parts OL2 remote from a rotary axis 1J by a distance r2. The rotary yoke 111A may have multiple protrusions 1AT each having the outer edge part OL1 and multiple depressions 1AU each having the outer edge part OL2 that are alternately provided along the rotation direction Bθ. Likewise, the rotary yoke 111B may have outer edge parts OL3 remote from the rotary axis 1J by a distance r3 and outer edge parts OL4 remote from the rotary axis 1J by a distance r4. The rotary yoke 111B may have multiple protrusions 1BT each having the outer edge part OL3 and multiple depressions 1BU each having the outer edge part OL4 that are alternately provided along the rotation direction Bθ. With reference to FIG. 24C, the protrusions 1AT and the depressions 1AU of the rotary yoke 111A may be provided at an arrangement pitch substantially the same as the arrangement pitch of the protrusions 1BT and the depressions 1BU of the rotary yoke 111B in the rotation direction Bθ. Additionally, the depression 1BU may be disposed collinear with the protrusion 1AT in the rotary-axis direction Bz, and protrusion 1BT may be disposed collinear with the depression 1AU in the rotary-axis direction Bz.

Accordingly, the rotation detection system according to the sixth embodiment of the disclosure is expected to provide similar effects to those of the rotation detection system according to the fourth embodiment described above. Furthermore, the rotary module 101A according to the sixth embodiment may have the two rotary yokes 111A and 111B adjacent to each other in the rotary-axis direction Bz. This reduces an influence of positional shift of the sensor 103 and the magnet 106 in the rotary-axis direction Bz on accuracy in rotation detection, compared with the fourth embodiment. One reason for this is that the component Bθ along the rotation detection Bθ in the magnetic field generated by the magnet 106 and the component Br along the radial direction Br in the magnetic field generated by the magnet 106 may change in a sine wave manner with a phase difference of 90° in synchronization with the rotation of the rotary yokes 111A and 111B. The rotary yokes 111A and rotary yoke 111B may be fixed to the shaft 110 with a predetermined interval between the rotary yoke 111A and the rotary yoke 111B in the rotary-axis direction Bz. Accordingly, the positional shifts of the sensor 103 and the rotary yokes 111A and 111B in the rotary-axis direction Bz may be controlled by adjusting the positions of the sensor 103 and the shaft 110. Furthermore, the rotation detection system according to the sixth embodiment may include the sensor 103 disposed between the rotary yoke 111A and the rotary yoke 111B. When the sensor 103 is shifted remote from the rotary yoke 111A along the rotary-axis direction Bz, for example, the sensor 103 may inevitably move closer to the rotary yoke 111B along the rotary-axis direction Bz. Accordingly, even when the sensor 103 moves farther away from the rotary yoke 111A and the magnetic flux density of the magnetic field covering the position of the sensor 103 is thus reduced, the rotary yoke 111B may move closer to the sensor 103 and complement the magnetic flux density of the magnetic field covering the position of the sensor 103. It therefore is possible for the rotation detection module according to the sixth embodiment of the disclosure to prevent a decrease in the detection sensitivity due to the influence of the positional shifts of the sensor 103 and the rotary module 101A in the rotary-axis direction Bz.

8. Seventh Embodiment

Figure 25:
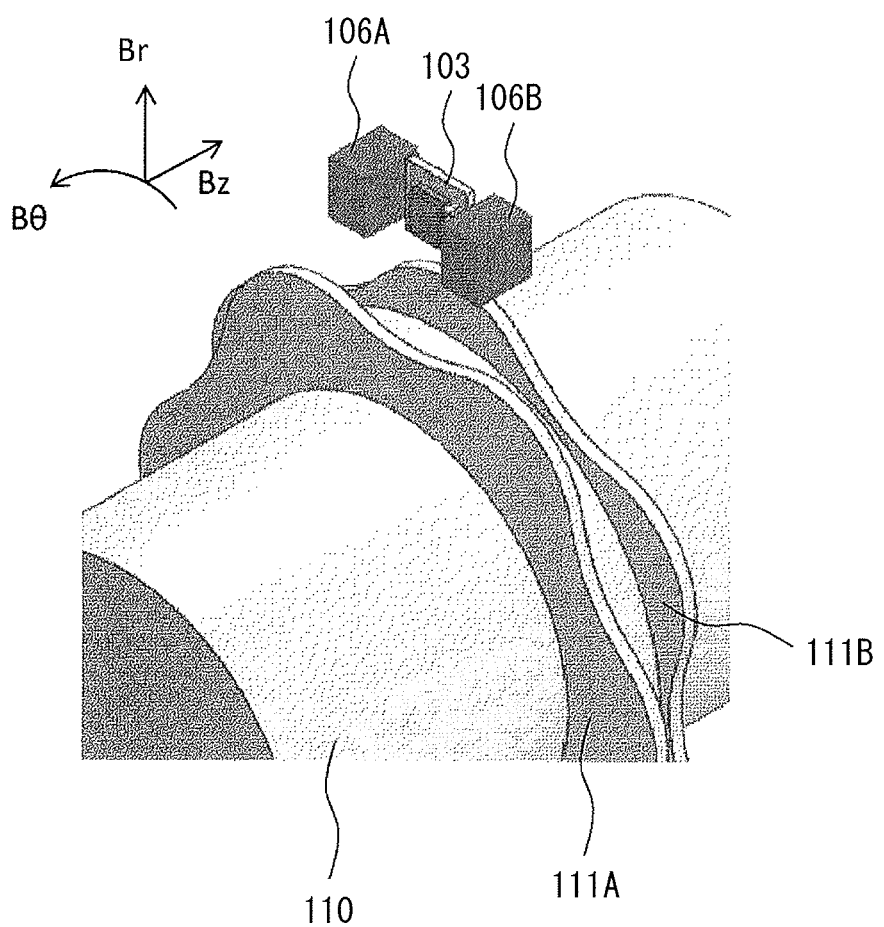
FIG. 25 is a schematic perspective view of a portion of a rotation detection system having an example configuration according to one embodiment of the disclosure.

An example configuration of a rotation detection system according to a seventh embodiment of the disclosure will now be described with reference to FIG. 25. FIG. 25 is a schematic perspective view of a portion of the rotation detection system according to the seventh embodiment of the disclosure. As illustrated in FIG. 25, the rotation detection system according to the seventh embodiment may include two magnets 106A and 106B and the two rotary yokes 111A and 111B with respect to the single sensor 103. In other words, the rotation detection system according to the seventh embodiment may have the configuration of the rotation detection system according to the fifth embodiment described above and the configuration of the rotation detection system according to the sixth embodiment described above in combination.

The rotation detection system according to the seventh embodiment is expected to provide similar effects to those of the position detection system according to the fourth embodiment described above. Furthermore, the rotation detection system according to the seventh embodiment allows the sensor 103 to detect a much larger output change than the rotation detection system according to the fourth embodiment does. Additionally, the rotation detection system according the seventh embodiment further reduces an influence of the positional shifts of the sensor 103 and the magnet 106 in the rotary-axis direction Bz on the accuracy in rotation detection, compared with the rotation detection system according to the fourth embodiment described above.

9. Modification Examples of Fourth to Seventh Embodiments

Although some of embodiments of the disclosure are described above, the disclosure should not be limited to these embodiments and may be modified in various ways. For example, although the magnet 106A and 106B may be disposed along the rotation direction Bθ of the rotary yoke 111 in the fifth embodiment described above, the arrangement of the magnet 106A and 106B should not be limited to that in the fifth embodiment.

First Modification Example

Figure 26A:
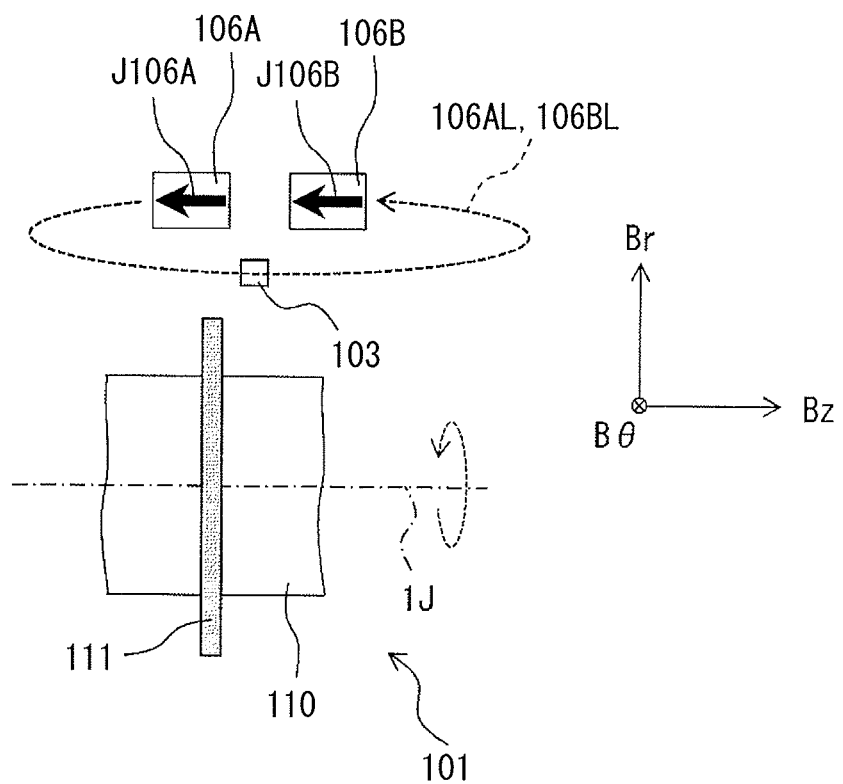
FIG. 26A is a front view of a portion of a rotation detection system according to one modification example of at least one embodiment of the disclosure.

In a rotation detection system according to a first modification example of the disclosure of the fourth to seventh embodiments, the magnets 106A and 106B may be disposed adjacent to each other with an interval therebetween in the rotary-axis direction Bz, as illustrated in FIG. 26A, for example. Also in the first modification example illustrated in FIG. 26A, the magnetic line 106AL generated by the magnet 106A and the magnetic line 106BL generated by the magnet 106B that pass through the sensor 103 may be directed in the direction along the rotary axis 1J. For example, the sensor 103 may be disposed between the magnet 106A and the magnet 106B in the rotary-axis direction Bz. In this embodiment where the magnet 106A and 106B are disposed in the rotary-axis direction Bz, portions of the magnetic lines 106AL and 106BL extending in the rotary-axis direction Bz may be longer than that in the embodiment where only the single magnet 106 is provided. This reduces an influence of shifts in relative positions of the sensor 103 and the rotary yoke 111 in the rotary-axis direction Bz on accuracy in rotation detection. Note that FIG. 26A is an enlarged front view of a portion of the rotation detection system according to the first modification example of the fourth to seventh embodiments of the disclosure.

Second Modification Example

Figure 26B:
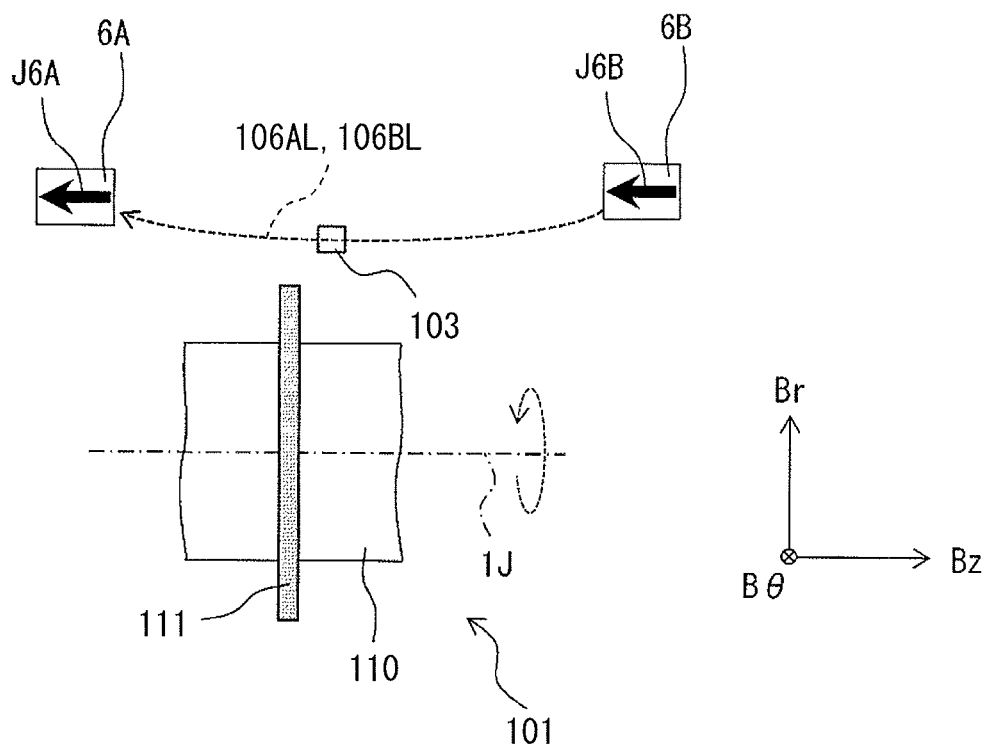
FIG. 26B is a front view of a portion of a rotation detection system according to one modification example of at least one embodiment of the disclosure.

In a rotation detection system according to a second modification example of the fourth to seventh embodiments of the disclosure, the magnets 106A and 106B may be opposed to each other across the rotary yoke 111 in the rotary-axis direction Bz, as illustrated in FIG. 26B, for example. Also in the second modification example, the magnetic lines 106AL and 106BL generated by the respective magnets 106A and 106B and passing through the sensor 103 may be directed in the direction along the rotary axis 1J. Additionally, the sensor 103 may be disposed between the magnet 106A and the magnet 106B in the rotary-axis direction Bz. The second modification example is more advantageous than the first modification example in a case where a sufficient space is not secured in the radial direction Br. Note that FIG. 26B is an enlarged front view of a portion of the rotation detection system according to the second modification example of the fourth to seventh embodiments of the disclosure.

Third Modification Example

Figure 26C:
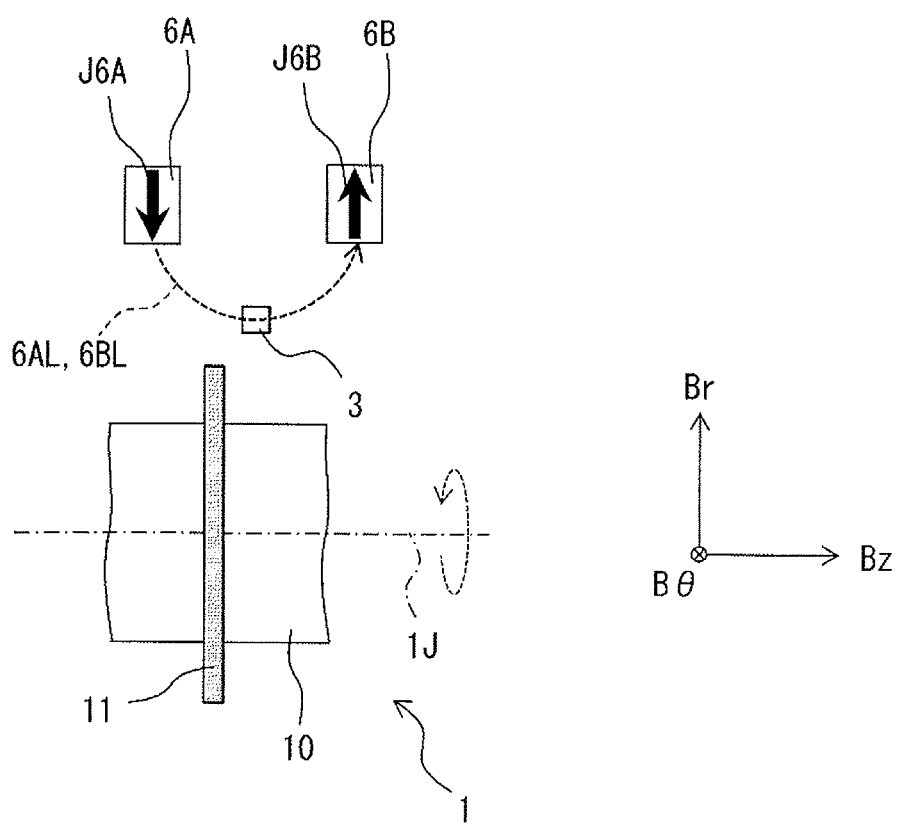
FIG. 26C is a front view of a portion of a rotation detection system according to one modification example of at least one embodiment of the disclosure.

Although the magnetization direction of the magnet may be set along the rotary-axis direction Bz in some of the foregoing embodiments of the disclosure, the disclosure should not be limited to the embodiments. In a rotation detection system according to a third modification example of the fourth to seventh embodiment of the disclosure, the magnetization direction J6A of the magnet 6A and the magnetization direction J6B of the magnet 6B may be set in the radial direction Br orthogonal to the rotary-axis direction Bz, as illustrated in FIG. 26C. Also in the third modification example, the magnetic lines 6AL and 6BL generated by the respective magnets 6A and 6B and passing through the sensor 3 may be directed in the direction along the rotary axis 1J. Additionally, the sensor 3 may be disposed between the magnet 6A and the magnet 6B in the rotary-axis direction Bz. Note that FIG. 26C is an enlarged front view of the rotation detection system according to the third modification example of the fourth to seventh embodiments of the disclosure.

Fourth Modification Example

Figure 27A:
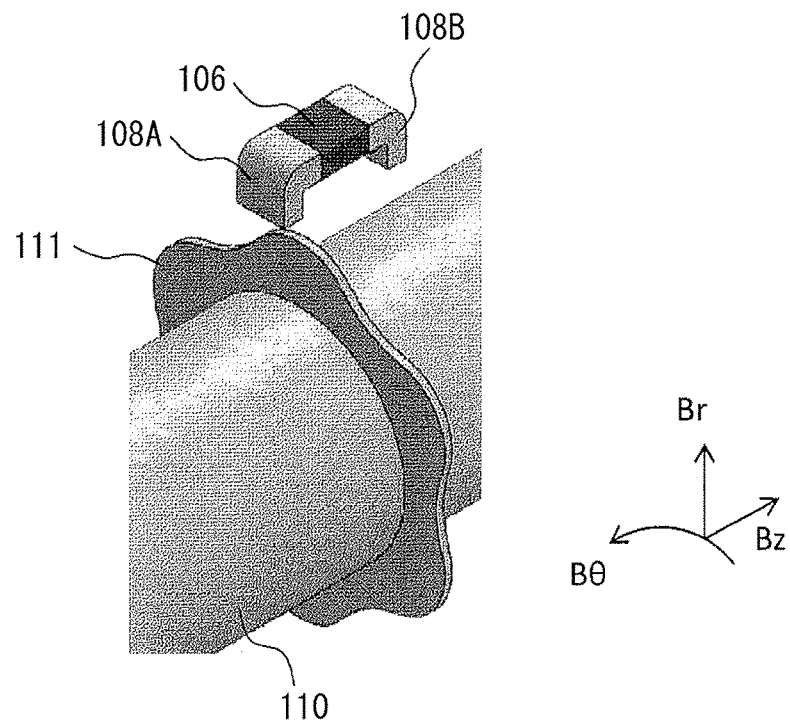
FIG. 27A is a schematic perspective view of a rotation detection system according to one modification example of at least one embodiment of the disclosure.
Figure 27B:
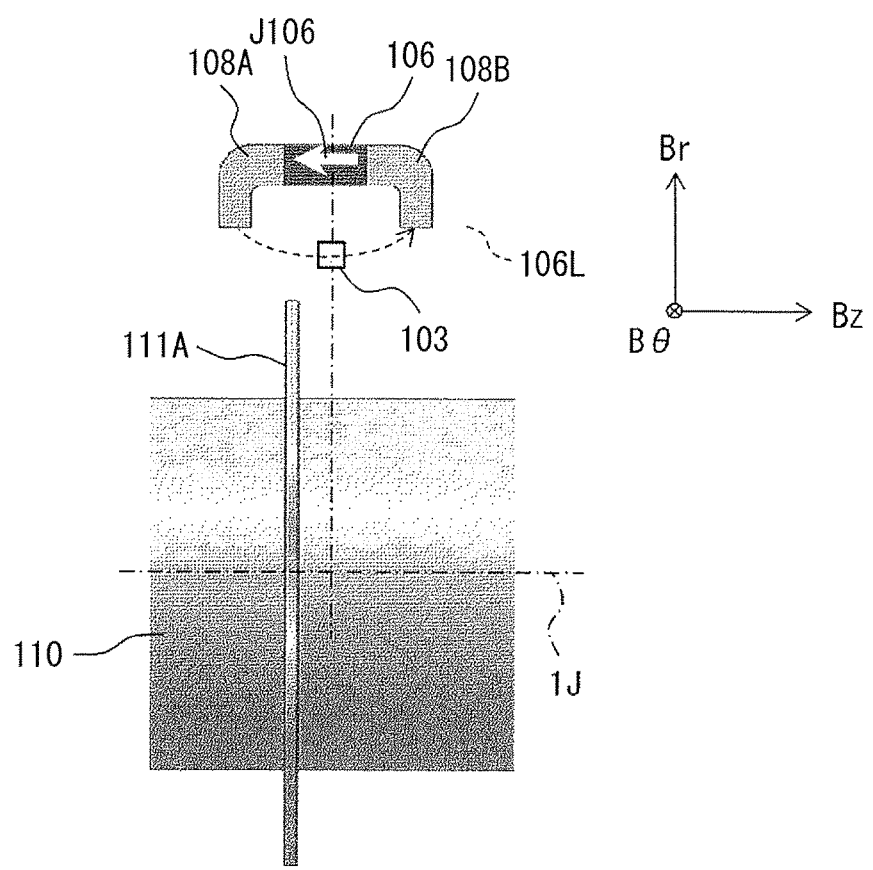
FIG. 27B is a schematic front view of a rotation detection system according to one modification example of at least one embodiment of the disclosure.

In a rotation detection system according to a fourth modification example of the fourth to seventh embodiments of the disclosure, the magnet 106 may be provided with yokes 108A and 108B, as illustrated in FIGS. 27A and 27B, for example. In the fourth modification example, the magnet 106 may be disposed between the paired yokes 108A and 108B along the magnetization direction J106 of the magnet 106. The yokes 108A and 108B allows the direction of the magnetic line 106L to be controlled and further increases the magnetic flux density along the magnetic line 106L passing through the sensor 103. The yokes 108A and 108B may include respective bents 108AT and 108BT curved from the magnet 106 toward the sensor 103. This still further increases the magnetic flux density along the magnetic line 106L passing through the sensor 103. Accordingly, the rotation detection system according to the fourth modification example is expected to achieve higher detection sensitivity. Note that FIG. 27A is an enlarged perspective view of a portion of the rotation detection system of the fourth modification example of the fourth to seventh embodiments of the disclosure, and FIG. 27B is an enlarged front view of the portion of the rotation detection system of the fourth modification example of the fourth to seventh embodiments of the disclosure. In FIG. 27A, illustration of the sensor 103 is omitted.

Fifth Modification Example

Figure 28:
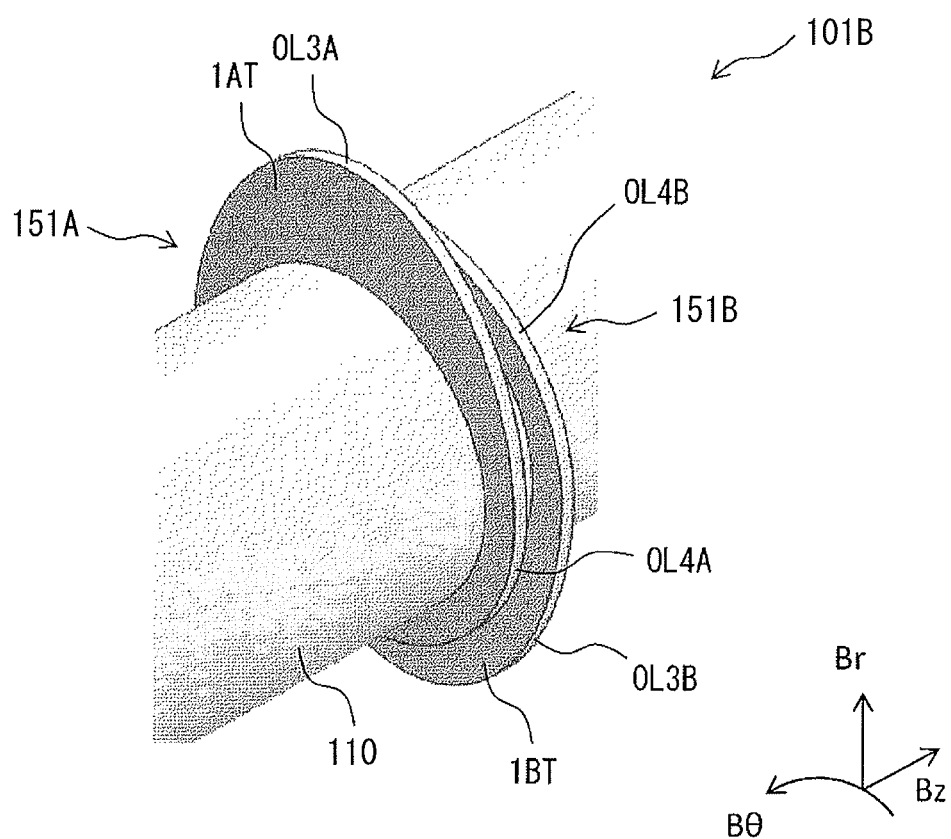
FIG. 28 is a schematic perspective view of a portion of a rotation detection system according to one modification example of at least one embodiment of the disclosure.

In at least one embodiments and modification examples described above, the rotary yoke 111 may have the protrusions 1T and the depressions 1U that are alternately provided. In other words, the rotary yoke 111 may have a petal shape on the rotation plane (Br-Bθ plane). However, it should be appreciated that the disclosure should not be limited to the embodiments. In a fifth modification example illustrated in FIG. 28, for example, a rotary module 101B may be provided which have a cam-shaped rotary yoke 151A having a single protrusion 1AT and a cam-shaped rotary yoke 151B having a single protrusion 1BT. The protrusion 1AT may have an outer edge parts OL3A and OL4A. The outer edge part OL3A may protrude in the radial direction Br farther than the outer edge part OL4A does. Likewise, the protrusion 1BT may have an outer edge parts OL3B and OL4B. The outer edge part OL3B may protrude in the radial direction Br farther than the outer edge part OL4B does. Additionally, the protrusions 1AT and 1BT may be provided at different positions in the rotation direction Bθ. The rotation detection system having the cam-shaped rotary yokes 151A and 151B may provide angular information ranging from 0° to 360° per rotation of the rotary yokes 151A and 151B, making it possible to determine the absolute value of the rotation angle of the shaft 110. In contrast, the petal-shaped rotary yoke 111, which has the protrusions 1T and the depressions 1U as illustrated in FIG. 18, for example, may provide angular information ranging from 0° to 360° several times per rotation of the rotary yoke 111, making it difficult to determine the absolute value of the rotation angle of the shaft 110.

Meanwhile, the petal-shaped rotary yoke 111, which has the protrusions 1T and the depressions 1U as illustrated in FIG. 18, may be advantageous in the following points. For example, the petal-shaped rotary yoke 111 according to at least one embodiment of the disclosure is appropriate for detection of a rotation angle of a motor using a typical resolver, for example, where that the number of protrusions and depressions of a yoke may be an even multiple of the number of poles of the motor in view of control issues. The petal-shaped rotary yoke 111 may be appropriately adjusted in the number of protrusions or depressions in accordance with the number of poles of the motor. Furthermore, the rotary yoke 111 having such an uneven and continuous outline may have no limitation in minimum resolution and provide an angular output that linearly changes with respect to a rotation angle. In contrast, in a case of an encoder, minimum resolution of an angle to be detected is determined depending on the width of a reference clock signal, resulting in an angular output changing stepwise with respect to the rotation angle.

Although the magnetic detector may include two magnetism detection devices in at least one of the embodiments and modification examples described above, the number of the magnetism detection devices should not be limited to two. In another embodiment of the disclosure, only one magnetism detection device may be provided, or three or more magnetism detection devices may be provided. Note that, in the embodiment where three or more magnetism detection devices are disposed, the magnetism detection devices may output signals having different phases.

Although the magnetic sensors 131 and 132 each having a magneto-resistive effect element are described as an example of the magnetism detection devices in the fourth embodiment described above, the disclosure should not be limited to the fourth embodiment. The magnetism detection device may be any device that detect a change in direction or angle of a magnet field. For example, the magnetism detection device may be a Hall effect device, in one modification example of the disclosure.

Additionally, in one modification example of the disclosure, the magnetic detector may include one or more biaxial magnetism detection devices each including a first detection axis and a second detection axis orthogonal to each other. Alternatively, in another modification example of the disclosure, the magnetic detector may have multiple pairs each including two adjacent magnetism detection devices, i.e., a first magnetism detection device having a first detection axis and a second magnetism detection device having a second detection axis orthogonal to the first detection axis. In a case where the biaxial magnetism detection devices are disposed at different positions or where the pairs of the magnetism detection devices are disposed at different positions, the biaxial magnetism detection devices or the pairs of the magnetism detection devices may be disposed at an arrangement pitch identical to the arrangement pitch of the protrusions of the soft ferromagnetic member in the movable direction of the soft ferromagnetic rotary member, for example. Additionally, the biaxial magnetism detection devices or the pairs of the magnetism detection devices may be disposed at substantially equal distance from a center plane of the magnet in the axial direction of the soft ferromagnetic rotary member magnet.

It is possible to achieve at least the following configurations from the foregoing embodiments and modification examples of the disclosure.

(1) A position detection system including:
a first magnet that has a magnetization magnetized in a first direction and generates a first magnetic field including a first magnetic line;
a first soft ferromagnetic member that extends along a second direction orthogonal to the first direction, is rectilinearly movable along the second direction with respect to the first magnet, and includes a first outer edge having an uneven shape, the first outer edge having a first outer edge part and a second outer edge part, the first outer edge part being remote from the first magnet by a first distance in a third direction orthogonal to the first direction and the second direction, the second outer edge part being remote from the first magnet by a second distance in the third direction, the first outer edge part and the second outer edge part being disposed at different positions in the second direction; and
a magnetic detector kept at a predetermined constant position relative to the first magnet, the first magnetic line passing through the magnetic detector in the first direction when the first soft ferromagnetic member is at rest.

(2) The position detection system according to (1), in which the first outer edge of the first soft ferromagnetic member has a shape defining a distance with respect to the first magnet in the third direction, the distance changing in a cycle in the second direction.

(3) The position detection system according to (2), in which a movable length of the first soft ferromagnetic member in the second direction is equal to or shorter than a length of the cycle of the first outer edge in the second direction.

(4) The position detection system according to (2) or (3), in which the first outer edge includes a first continuous curved line.

(5) The position detection system according to any one of (1) to (4), in which the magnetic detector is disposed between the first magnet and the first soft ferromagnetic member in the third direction.

(6) The position detection system according to any one of (1) to (5), in which
the magnetic detector has a first center position in the first direction,
the first soft ferromagnetic member has a second center position in the first direction, and
the first center position is different from the second center position in the first direction.

(7) The position detection system according to (1), further including a second soft ferromagnetic member that is opposed to the first soft ferromagnetic member in the first direction, extends along the second direction, is rectilinearly movable in synchronization with the first soft ferromagnetic member along the second direction with respect to the first magnet, and includes a second outer edge having an uneven shape, the second outer edge having a third outer edge part and a fourth outer edge part, the third outer edge part being remote from the first magnet by a third distance in the third direction, the fourth outer edge part being remote from the first magnet by a fourth distance in the third direction, the third outer edge part and the fourth outer edge part being disposed at different positions in the second direction.

(8) The position detection system according to (7), in which
the first outer edge of the first soft ferromagnetic member has a shape defining a distance with respect to the first magnet in the third direction, the distance changing in a cycle in the second direction, the cycle corresponding to a first length,
the second outer edge of the second soft ferromagnetic member has a shape defining another distance with respect to the first magnet in the third direction, the other distance changing in a cycle in the second direction, the cycle corresponding to the first length, and
the first outer edge and the second outer edge have phases different from each other by half of the cycle.

(9) The position detection system according to (7) or (8), in which
the first outer edge includes a first continuous curved face, and
the second outer edge includes a second continuous curved face.

(10) The position detection system according to any one of (1) to (9), in which
a direction of the first magnetic line changes in a cycle in association with a movement of the first soft ferromagnetic member in the second direction, and
the magnetic detector detects the direction of the first magnetic line that changes in the cycle.

(11) The position detection system according to any one of (1) to (10), further including a second magnet that generates a second magnetic field, the second magnetic field including a second magnetic line passing through the magnet detector in the first direction.

(12) The position detection system according to (11), in which the magnetic detector is disposed between the first soft ferromagnetic member and the first magnet or between the first soft ferromagnetic member and the second magnet.

(13) The position detection system according to (11) or (12), in which the first magnet and the second magnet are adjacent to each other in the second direction.

(14) The position detection system according to (13), in which the magnetic detector is disposed between the first magnet and the second magnet in the second direction.

(15) The position detection system according to any one of (1) to (14), in which the magnetic detector includes a first magnetism detection device and a second magnetism detection device, the first magnetism detection device having a first detection axis, the second magnetism detection device having a second detection axis intersecting the first detection axis.

(16) The position detection system according to (15), in which
the first detection axis is substantially identical to the second direction, and
the second detection axis is substantially identical to the third direction.

According to the position detection system of at least one embodiment of the disclosure, the direction of the first magnetic line of the first magnetic field imparted from the first magnet to the magnetic detector may be substantially orthogonal to the second direction along which the first soft ferromagnetic member rectilinearly moves. The accuracy of the magnetic detector in detecting a position of the first soft ferromagnetic member is thus unlikely to be influenced by the relative positions between the magnetic detector and the first soft ferromagnetic member. Additionally, the position of the first soft ferromagnetic member with respect to the magnet detector may be detected without moving the first magnet with respect to the magnet detector.

According to the position detection system of at least one embodiment of the disclosure, the accuracy of the magnet detector in detecting the position of the first soft ferromagnetic member is unlikely to be influenced by shifts in relative positions among the magnetic detector, the first soft ferromagnetic member, and the first magnet even when downsized. Accordingly, it is possible with the position detection system to detect a position of the first soft ferromagnetic member with high accuracy even when downsized. Additionally, the first magnet does not move with respect to the magnetic detector. This increases the displacement of the first soft ferromagnetic member in the second direction without the need for increasing the size of the first magnet. Accordingly, the position detection system according to at least one embodiment of the disclosure has a compact configuration and makes it possible to detect a position of a moving object with high accuracy. Furthermore, in the position detection system according to at least one embodiment of the disclosure, the first magnet does not move with respect to the magnetic detector, and the magnet detector detects a change in the direction of the magnet field generated by the first magnet in accordance of the shift of the first soft ferromagnetic member. This helps stably generating a magnetic field intensity strong enough to be detected by the magnetic detector, increasing the displacement of the first soft ferromagnetic member in the second direction without the need for increasing the size of the first magnet. Accordingly, the position detection system according to at least one embodiment of the disclosure has a compact configuration and makes it possible to detect a position of a moving object with higher accuracy.

What is claimed is:

1. A position detection system comprising:
a first magnet that has a magnetization magnetized in a first direction and generates a first magnetic field including a first magnetic line;
a first soft ferromagnetic member that extends along a second direction orthogonal to the first direction, is rectilinearly movable along the second direction with respect to the first magnet, and includes a first outer edge having an uneven shape, the first outer edge having:
a first outer edge part that is remote from the first magnet by a first distance in a third direction orthogonal to the first direction and the second direction; and
a second outer edge part that is remote from the first magnet by a second distance in the third direction, the first outer edge part and the second outer edge part being disposed at different positions in the second direction; and
a magnetic detector kept at a predetermined constant position relative to the first magnet, the first magnetic line passing through the magnetic detector in the first direction when the first soft ferromagnetic member is at rest, the magnetic detector and the first soft ferromagnetic member being positioned without overlapping each other in a direction orthogonal to the first direction.

2. The position detection system according to claim 1, wherein the first outer edge of the first soft ferromagnetic member has a shape defining a distance with respect to the first magnet in the third direction, the distance changing in a cycle in the second direction.

3. The position detection system according to claim 2, wherein a movable length of the first soft ferromagnetic member in the second direction is equal to or shorter than a length of the cycle of the first outer edge in the second direction.

4. The position detection system according to claim 2, wherein the first outer edge includes a first continuous curved face.

5. The position detection system according to claim 1, wherein the magnetic detector is disposed between the first magnet and the first soft ferromagnetic member in the third direction.

6. The position detection system according to claim 1, further comprising:
a second soft ferromagnetic member that is opposed to the first soft ferromagnetic member in the first direction, extends along the second direction, is rectilinearly movable in synchronization with the first soft ferromagnetic member along the second direction with respect to the first magnet, and includes a second outer edge having an uneven shape, the second outer edge having:
a third outer edge part that is remote from the first magnet by a third distance in the third direction; and
a fourth outer edge part that is remote from the first magnet by a fourth distance in the third direction, the third outer edge part and the fourth outer edge part being disposed at different positions in the second direction.

7. The position detection system according to claim 6, wherein
the first outer edge of the first soft ferromagnetic member has a shape defining a distance with respect to the first magnet in the third direction, the distance changing in a cycle in the second direction, the cycle corresponding to a first length,
the second outer edge of the second soft ferromagnetic member has a shape defining another distance with respect to the first magnet in the third direction, the other distance changing in a cycle in the second direction, the cycle corresponding to the first length, and
the first outer edge and the second outer edge have phases different from each other by half of the cycle.

8. The position detection system according to claim 6, wherein
the first outer edge includes a first continuous curved face, and
the second outer edge includes a second continuous curved face.

9. The position detection system according to claim 1, wherein
a direction of the first magnetic line changes in a cycle in association with a movement of the first soft ferromagnetic member in the second direction, and
the magnetic detector detects the direction of the first magnetic line that changes in the cycle.

10. The position detection system according to claim 1, further comprising:
a second magnet that generates a second magnetic field, the second magnetic field including a second magnetic line passing through the magnet detector in the first direction.

11. The position detection system according to claim 10, wherein the magnetic detector is disposed between the first soft ferromagnetic member and the first magnet or between the first soft ferromagnetic member and the second magnet.

12. The position detection system according to claim 10, wherein the first magnet and the second magnet are adjacent to each other in the second direction.

13. The position detection system according to claim 12, wherein the magnetic detector is disposed between the first magnet and the second magnet in the second direction.

14. The position detection system according to claim 1, wherein the magnetic detector includes:
a first magnetism detection device having a first detection axis; and
a second magnetism detection device having a second detection axis intersecting the first detection axis.

15. The position detection system according to claim 14, wherein
the first detection axis is substantially identical to the second direction, and
the second detection axis is substantially identical to the third direction.

* * * * *